(12) United States Patent
Lindgren et al.

(10) Patent No.: US 6,597,787 B1
(45) Date of Patent: Jul. 22, 2003

(54) ECHO CANCELLATION DEVICE FOR CANCELLING ECHOS IN A TRANSCEIVER UNIT

(75) Inventors: Ulf Lindgren, Lund (SE); Mohan Misra, Lund (SE); John Philipsson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 10 days.

(21) Appl. No.: 09/628,932

(22) Filed: Jul. 28, 2000

(30) Foreign Application Priority Data

Jul. 29, 1999 (DE) .......................................... 199 35 808

(51) Int. Cl.⁷ ................................................ H04M 9/08
(52) U.S. Cl. ........................... 379/406.05; 379/406.01; 379/406.02; 379/406.03; 379/406.06; 379/406.08; 379/406.09
(58) Field of Search ........................ 379/406.01–406.16

(56) References Cited

U.S. PATENT DOCUMENTS

| | | | |
|---|---|---|---|
| 4,609,787 A | * | 9/1986 | Horns |
| 5,157,653 A | | 10/1992 | Genter |
| 5,222,251 A | | 6/1993 | Roney, IV et al. |
| 5,283,784 A | | 2/1994 | Genter |
| 5,475,731 A | * | 12/1995 | Rasmussion |
| 5,561,668 A | | 10/1996 | Genter |
| 5,563,944 A | | 10/1996 | Hasegawa |
| 5,600,718 A | * | 2/1997 | Dent et al. |
| 5,646,991 A | | 7/1997 | Sih |
| 5,680,450 A | * | 10/1997 | Dent et al. |
| 5,721,730 A | | 2/1998 | Genter |
| 5,920,834 A | * | 7/1999 | Sih et al. |
| 5,937,060 A | * | 8/1999 | Oh |
| 5,943,429 A | * | 8/1999 | Handel |
| 6,081,732 A | * | 6/2000 | Suvanen et al. |
| 6,163,608 A | * | 12/2000 | Romesburg et al. |
| 6,163,609 A | * | 12/2000 | Makinen et al. |
| 6,185,300 B1 | * | 2/2001 | Romesburg |

FOREIGN PATENT DOCUMENTS

| | | |
|---|---|---|
| DE | 19729521 A | 1/1999 |
| EP | 0712213 A | 5/1996 |
| EP | 0 884 886 | 12/1998 |
| FR | 2675648 A | 10/1992 |
| JP | 63-42527 | 2/1988 |
| WO | WO97/45995 | 12/1997 |
| WO | WO98/33311 A | 7/1998 |
| WO | WO99/35813 A | 7/1999 |

OTHER PUBLICATIONS

Boll, S; "Suppression of Acoustic Noise in Speech Using Spectral Subtraction" in IEEE Trans. on Acoustics, Speech, and Signal Processin, vol. ASSP–27, No. 2, Apr. 1979; pp. 113–120.*

* cited by examiner

Primary Examiner—Forester W. Isen
Assistant Examiner—Ramnandan Singh
(74) Attorney, Agent, or Firm—Burns, Doane, Swecker & Mathis, L.L.P.

(57) ABSTRACT

An echo cancellation device (ECD) comprises an echo canceller (EC) including a transfer function estimator (EST, H) and a subtractor (ADD) and a residual echo suppression device (G, ADD2). The residual echo suppression device (G) comprises a residual echo filter (G) having an adjustable filter function (g). This filter function (g) can be adapted to either remove from the subtractor output (TNE') the spectral characteristics relating to the reception signal (RFE) and/or to emphasize in the subtractor output signal (TNE') a background signal spectral content relating to the transmission signal (TNE). A noise generation means (NGM') can be provided at the output of the adaptable filter (G) for injecting a noise process in to the filter output signal (TNE') prior to a speech coding in a speech coder (COD). The noise process masks in the filter output signal a spectral content relating to the reception signal (RFE).

26 Claims, 12 Drawing Sheets

BACKGROUND OF THE INVENTION

PRIOR ART I

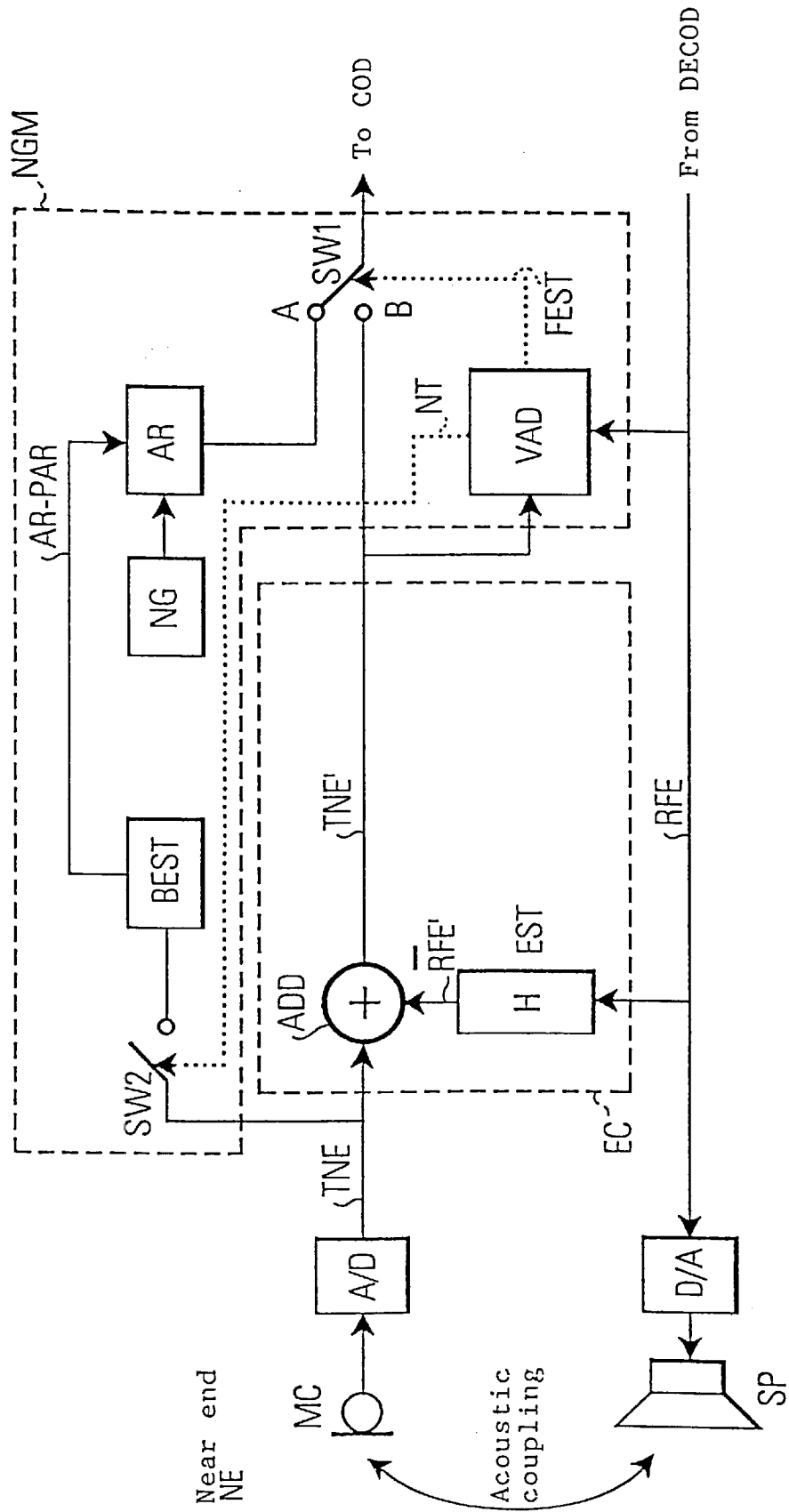
*FIG. 2B* PRIOR ART III

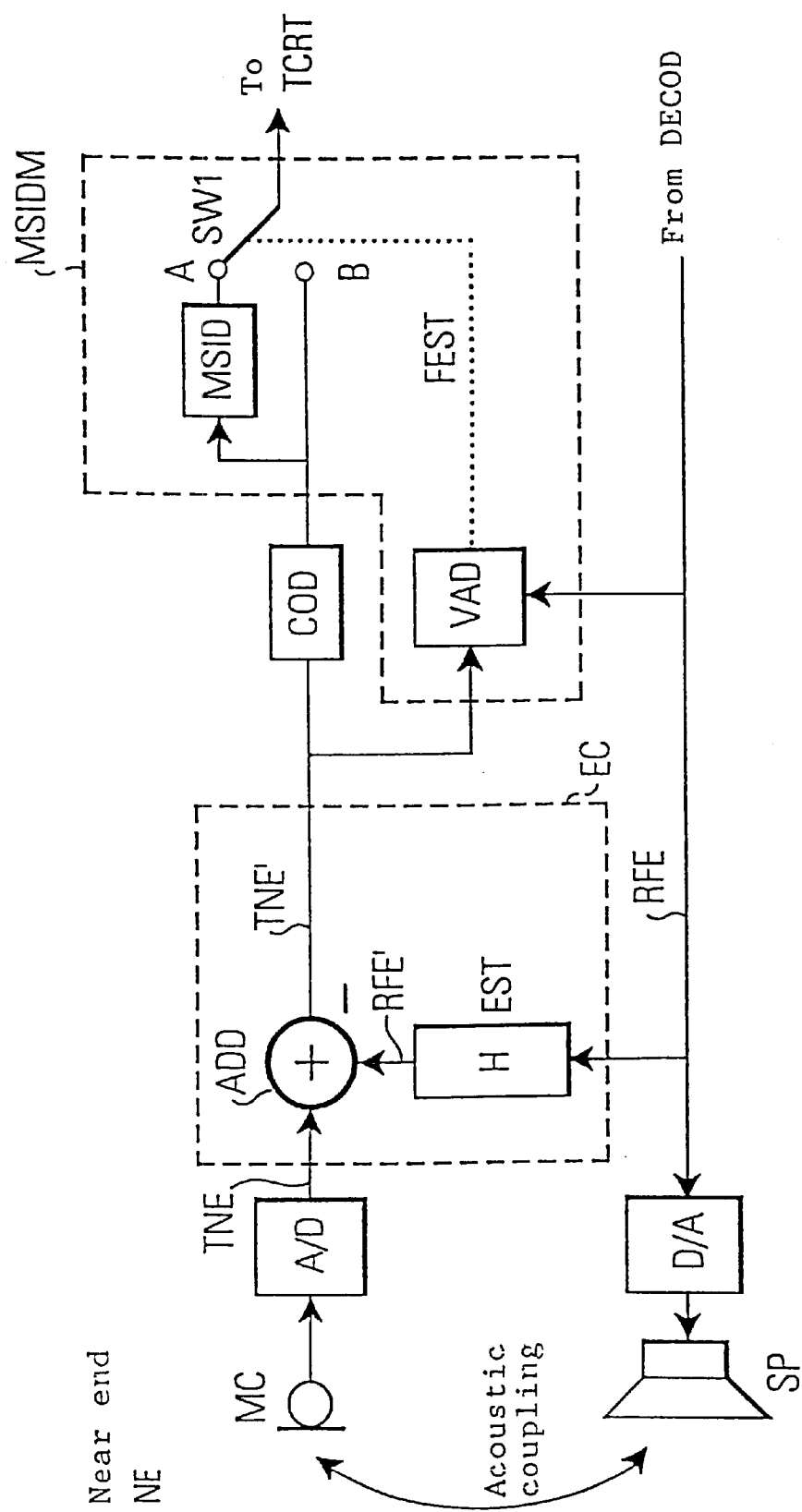
FIG. 2C PRIOR ART IV

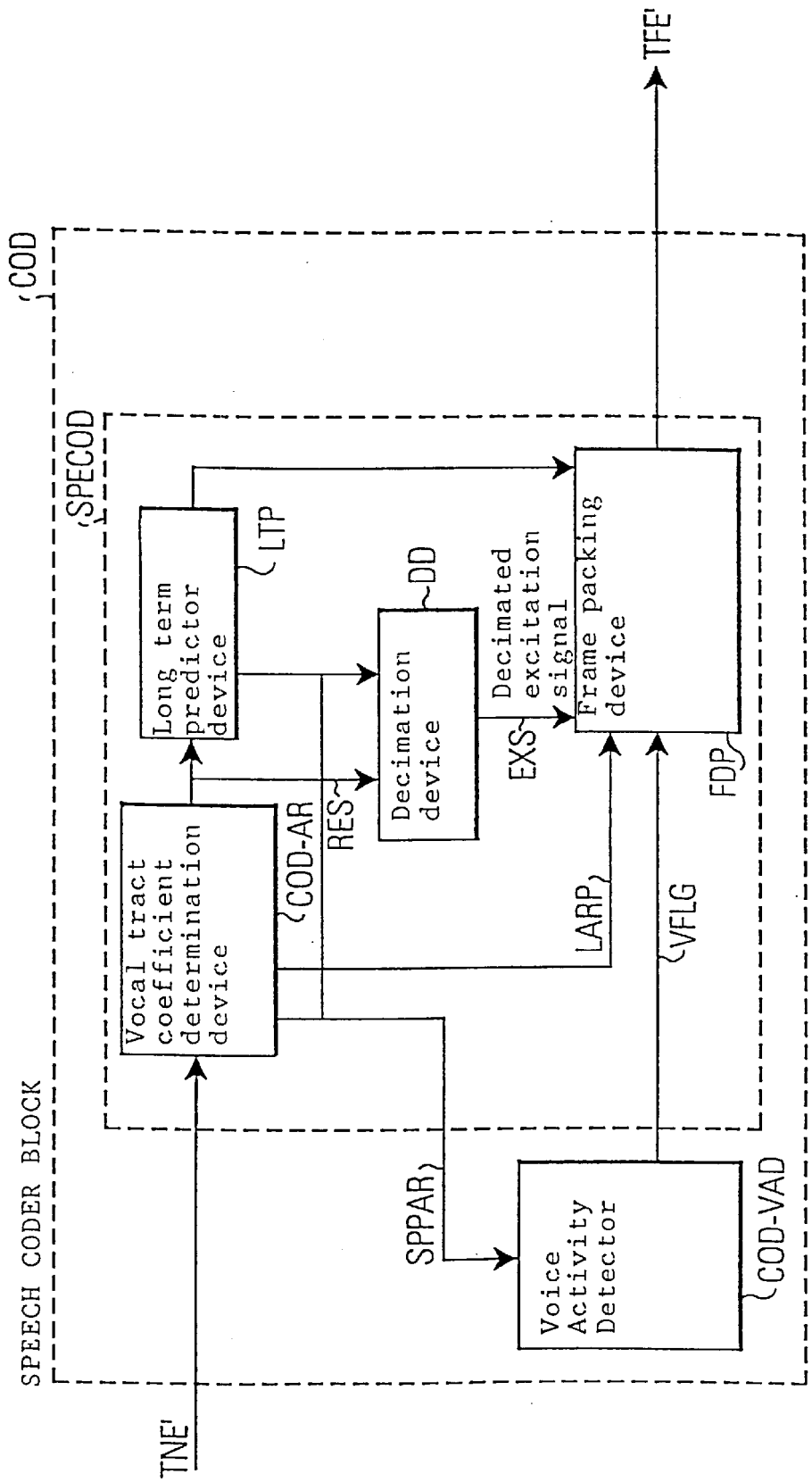
FIG.3 PRIOR ART II

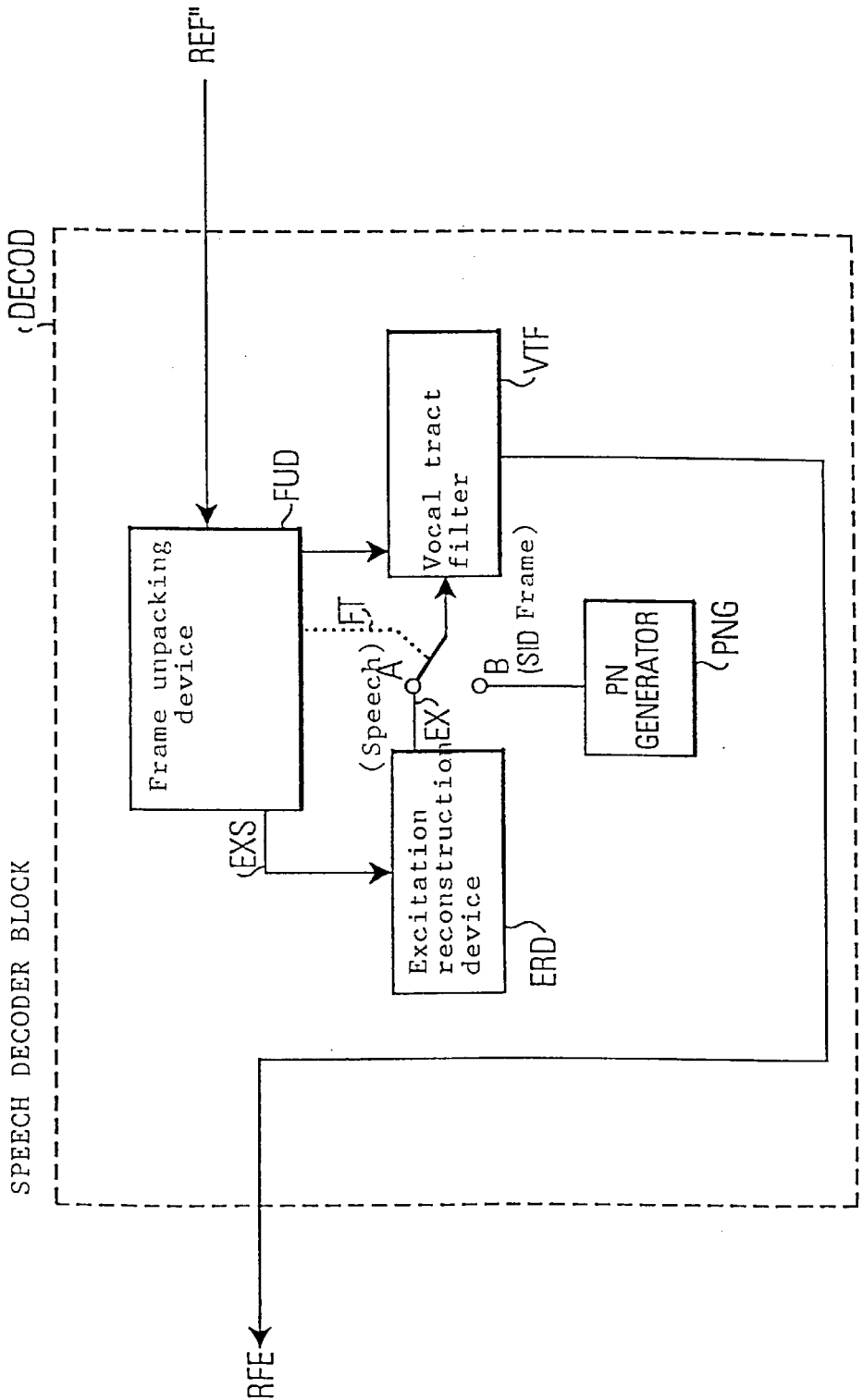
FIG.4 PRIOR ART II

FIRST EMBODIMENT

SECOND EMBODIMENT

THIRD EMBODIMENT

ECHO CANCELLATION DEVICE FOR CANCELLING ECHOS IN A TRANSCEIVER UNIT

This application claims priority under 35 U.S.C. §§119 and/or 365 to 199 35 808.7 filed in Germany on Jul. 29, 1999; the entire content of which is hereby incorporated by reference.

FIELD OF THE INVENTION

The invention relates to an echo cancellation device for canceling echoes caused by a coupling of a reception signal received by a receiving unit of a transceiver unit of a telecommunication system to a transmitting unit of the transceiver unit. In particular, the invention eliminates echoes which are introduced in the transmitting path of the transceiver unit as a result of an acoustic coupling between a loudspeaker of the receiving unit to a microphone of the transmitting unit.

More specifically, the echo cancellation device is intended to eliminate so-called residual echoes in the transmitting path which remain in the output of a conventional echo canceller after a main echo cancellation has been carried out.

BACKGROUND OF THE INVENTION

FIG. 1 shows in connection with FIG. 2A a block diagram of a conventional echo canceller EC of a transceiver unit TRU of a telecommunication system TELE. Via an antenna ANT and an antenna switch SW a signal RFE''' is input and processed by a receiving unit RX. A receiver circuitry RCRT and a decoder DECOD contain all the high frequency and low frequency circuits for providing a reception signal RFE to a loudspeaker SP via a D/A-converter and to the echo canceller EC. In the low frequency path of the receiving unit RX the speech decoder DECOD recomposes speech from the information contained in the signal RFE''' (see FIG. 1). This recomposing of speech will be explained with more detail with reference to FIG. 4 which shows a schematic block diagram of the speech decoder DECOD. Hereinafter, the signal RFE received from a far end transceiver unit will also be called the "far end signal" whilst the signal TFE provided by the near end transceiver unit to the far end transceiver unit will be denoted as the "transmitted near end signal".

As in particular shown schematically in FIG. 2A, the far end signal RFE is emitted from the loudspeaker SP of the transceiver unit TRU and is acoustically coupled to the transmitting unit TR, in particular to the microphone MC thereof. Also other coupling effects are conceivable, i.e. through a parasitic electrical coupling between the receiving and the transmitting units RX, TR. Thus, the far end signal emitted from the loudspeaker SP together with the microphone MC form a closed loop system causing the far end signal RFE to be transmitted back to the far end transceiver unit.

In most telecommunication systems TELE, in particular in a global system for mobile communications (Global System for Mobile Communication GSM), the transmitted signal TNE', TFE will be delayed, such that the user of a far end transceiver unit will perceive this as an echo. In this connection it should be noted that the teachings disclosed herein are not particularly limited to a mobile radio communication system but also apply to other communication systems where two transceiver units transmit and receive speech. Therefore, the radio transmission via an antenna ANT is only one example of such telecommunication systems.

Due to the acoustic and/or electrical coupling effect, a portion of the far end signal will always be present in the transmitting path independently as to whether or not the user of the near end transceiver unit actually speaks into the microphone MC or not. This aspect as to whether speech is present or not will be investigated with more details below.

Prior Art I: Residual Echo Cancellation

To eliminate the far end signal being transmitted to the far end transceiver unit, an echo cancellation device EC comprising a transfer function estimator EST, H and a subtractor ADD is used, cf. FIG. 2B. Basically, the transfer function estimator EST, H is adapted to estimate the coupling transfer function H from the receiving unit RC to the transmitting unit TR and for processing the reception signal RFE with said estimated coupling transfer function H. In particular, if the acoustic coupling is considered, the transfer function estimator EST, H estimates the acoustic transfer function from loudspeaker SP to the microphone MC. The filter output signal. RFE' is subtracted by the subtractor ADD from the transmission signal TNE which includes an echo signal due to the acoustic and/or electric coupling of the received signal RFE to the transmitting unit. Ideally, the use of the transfer function estimator and the subtractor should be enough to completely eliminate the occurrence of the reception signal RFE in the output signal TNE' from the echo canceller EC.

However, in practice the main or basic echo cancellation by using the transfer function estimator and the subtractor cannot remove the returning signal completely. The reason for this is that the transfer function estimator H, EST cannot perfectly estimate the transfer function, in particular the transfer function of the acoustic coupling between the loudspeaker SP and the microphone MC. Consequently, some parts of the received far end signal RFE will still be present in the signal TNE' transmitted to the far end transceiver unit. In the far end transceiver unit such remaining parts will still be perceived as an echo. Since a main echo cancellation has already removed some of the main echoes, the remaining parts of the far end signal are called "residual echoes". Therefore, additional signal processing has to be applied to the residual signal TNE' and in the context of conventional echo cancellation this additional processing is called "residual echo cancellation". Thus, in some conventional echo cancellation devices an additional residual echo suppression device is used for suppressing residual echoes in the subtractor output signal TNE'. This will be considered below with reference to some examples of the published prior art.

Prior Art II: GSM Speech Coding/Decoding

In modern mobile communication systems, i.e. GSM, the voice signal TNE' of FIG. 1, is not transmitted as a representation of the voice signal amplitudes. Instead the voice signal is coded and in GSM the speech coding is based on a model for speech generation. Commonly used methods to model speech are described in L. R. Rabiner and R. W. Schafer, *Digital Processing of Speech Signals,* Prentice Hall, Englewood Cliffs, N.J., 1978. In particular, a model which models the excitation signal and the vocal tract of the speaker is often used in signal processing. This model is defined by two types of excitation signals and a filter. The two excitation signals correspond to:

1) a pulse train used for voiced speech, e.g. the sound "a";
2) a white noise used for unvoiced speech, e.g. the sound "s".

The used filter models the vocal tract and it is convenient to use an AutoRegressive (AR) filter. By using the speech model it is possible to create an artificial voice. Actually, the voice will sound unnatural due to the excitation signals. However, if the excitation is chosen with care, more natural sounding speech can be produced.

Typically, speech modelling is used in speech coders, e.g. in the Full Rate (FR) coder in GSM. The FR coder is known as a Regular Pulse Excitation-Long Term Prediction (RPE-LTP) coder and is described in for example the GSM specification GSM 06.10. A simplified description, see FIG. 3, of the FR coder is as follows:

A frame of input samples TNE', in GSM one frame consists of 160 samples, is presented to the coder input, e.g. in the form of the signal TNE' output by the echo canceller EC. The input is used so as to determine an AR model, in FIG. 3 represented by COD-AR. This is accomplished by exploiting the Toeplitz structure of the TNE' correlation matrix, i.e. using a Schür recursion as described in J. G. Proakis and D. G. Manolakis: *Digital signal processing: principles, algorithms and applications,* Macmillan, publishing company, New York, 2nd edition, 1992. This recursion results in a set of coefficients termed reflection coefficients and may be used in a lattice filter realization. Based on the obtained coefficients the input frame is filtered through the inverse of the AR model (which can be implemented as a lattice structure), which ideally would produce the excitation signal output as the residual signal denoted RES in FIG. 3, (note, here residual signal is not equivalent to residual echo). That is, the spectral characteristics of the input signal have been flattened.

It is clear that the AR filter computed along with the residual signal can be used to restore the original input signal by filtering. However, the transmission of parameters and the residual signal would not correspond to a good compression ratio. To increase the compression ratio the GSM FR coder exploits the residual signal to compute a long term prediction in a device LTP of FIG. 3, which essentially corresponds to a measure of the periodic nature of the residual, e.g. a frequency related to the vibration of the vocal cords. Based on the long term prediction LTP the residual signal is down sampled (re-sampled) by a factor of three in a device DD (decimation device) in FIG. 3.

The re-sampled residual signal EXS, the AR filter coefficients LARP and the gain coefficients are quantized and organized in a block referred to as a speech frame (260 bits). This is performed in FIG. 3 by a frame packing device FPD. A few other coefficients are also included in the speech frame but these will be left out for reasons of simplicity as described in GSM 06.10.

At the receiver end, see FIG. 4, the speech frame is unpacked in the frame unpacking device FUD and the residual signal is up-sampled in the excitation reconstruction device ERD and is used as excitation signal EX to the vocal tract filter VTF (which is an AR filter). The above description is only a simplification of the GSM-FR speech coder. No effort has been invested in what formats the filter coefficients have. However, broadly speaking, the filter parameters are transmitted as Log Area Ratio (LAR) parameters, denoted LARP in FIG. 3, rather than a reflection coefficient or the coefficients occurring in the denominator polynomial of the AR filter.

As shown in FIG. 3, the speech coder COD comprises the coding block SPECOD and a voice activity detector COD-VAD. As explained above, the vocal tract is modeled by an Auto Regressive (AR) Model in an COD-AR Unit. Thus, the parameters LARP of the AR model (i.e. the vocal tract filter) and information EXS regarding the excitation signal are transmitted to the far end transceiver unit.

As shown in FIG. 1, after receiving frames of the reception signal REF" including the AR parameters LARP and the excitation signal information EXS by an antenna ANT and an antenna switch SW and a receiving circuit RCRT, the received parameters and the received information is used to perform a speech synthesis in a speech decoder DECOD, depicted in FIG. 4. As explained, the transmission of the parameters and the information of the speech model is carried out on a frame-basis, requiring—dependent on the used speech model and the transmission speed—a certain bandwidth (number of bits per second) which must be provided by the transmitting unit TR. This required bandwidth can be quite large and can thus cause the resources of the transmitting unit TR to be occupied to a large extent during the transmission of speech.

However, in a typical telephone call there are also speech pauses where the near end speaker does not speak into the microphone MC, i.e. no speech is present in the near end transmitting signal TNE. In this case, the speech coder COD only has to code background noise. The coding of quite irrelevant background noise with the same bandwidth as used for the coding of the speech would be quite a waste of resources in the transmitting unit TR. Therefore, in the speech pauses, modern speech coders COD often enter a mode called Discontinuous Transmission Mode (DTX) controlled by the Voice Activity Detector (VAD) COD-VAD, linked to the speech coder COD. In the DTX mode of operation, the speech coder codes the background noise using the AR model device COD-AR within the coder block. However, in DTX mode the coded parameters are packed in the frame packing device FPD in a special frame which is called the Silence Descriptor (SID) frame. The unit TCRT responsible for the GSM protocol can determine when and where (in the TDMA structure) the SID frame is sent via the antenna ANT. By using the DTX mode a lower bit rate can be used.

More specifically, the VAD used in GSM is defined in GSM 06.32 which based on the input frame in the signal TNE' determines if a frame contains speech or not. The VAD used in GSM monitors the transmission speech coder parameters SPPAR related to TNE (more precisely the transmission signal TNE' output by the echo canceller EC) to detect speech pauses. The VAD sets a so-called VAD flag VFLG in FIG. 3 to one or zero so as to indicate speech and no speech, respectively. This voice activity detection is based on an adaptable energy threshold, i.e. the voice activity detection depends on the energy of the observed signal TNE'. For example, when the signal input to the voice activity detector VAD falls below a predetermined threshold, the input signal is marked as no speech. To avoid a truncating of low power speech, an extra delay may be used (which is called the hangover-time), before the VAD flag is set. The use of the SID frame is incorporated and defined in the standard protocols of GSM.

In addition to the voice activity detection, the voice activity detector COD-VAD estimates the periodicity of the input signal (TNE or TNE'), which will be an additional decision factor for the setting of the VAD flag VFLG. Provided the input frame of the signal TNE' does not contain speech as indicated by the respective setting of the flag VFLG the speech coder will form the special Silence Descriptor SID frame in the frame packing device FPD. The SID frame consists only of the filter coefficients LARP as determined by the device COD-AR.

Upon receiving and detecting a SID frame on the receiving side in the decoder DECOD in FIG. 4, a Pseudo Noise generator device PNG is used as input to the vocal track filter VTF (position B in FIG. 4). The output at the receiver side is termed comfort noise and is supposed to mimic the background noise at the transmitter side.

Consequently, in case of a set VAD flag VFLG, a SID frame is made in which the AR parameters from the device COD-AR, i.e. the vocal tract parameters, are the only valid data. Evidently, the speech coder always operates on each input frame from the signal TNE' and always produces an output frame TFE' (speech or SID frame). However, in case the output of the speech coder is a SID frame the GSM protocol allows a reduced transmission rate of consecutive SID frames in the signal TFE. That is, the transmission unit TCRT of the transceiver unit TRU does not have to transmit the parameters and the information at the same bit rate as used during speech coding. Consequently the transmitting unit TCRT can save power and increase the battery life of the transceiver unit TRU.

As explained, the SID frame is transmitted to the far end transceiver unit TRU and the speech decoder DECOD unpacks in the frame unpacking device FUD of FIG. 4 the SID frame as so-called comfort noise. Therefore, on the receiver side TRU only the AR model VTF is driven by a white noise generated by a Pseudo Noise (PN) Generator PNG located in the receiving unit RX of FIG. 1, for example in the speech decoder DECOD, cf. FIG. 4. Alternatively, if the communication terminates in a telephone of a Public Switched Telephone Network (PSTN), then the speech coder COD, decoder DECOD and pseudo noise generator PNG can be located in the network.

Prior Art III/IV: Generation of Background Noise

As shown in FIG. 2B and FIG. 2C, rather than just producing SID frames in DTX mode as explained above, it is also possible to manipulate the speech coder COD such that it will transmit codes for the background noise only when no speech is present. Basically, this can be done in two ways:

I) Taking an output frame from the speech coder COD and convert it to a SID frame (FIG. 2C; and II) Alternatively, synthetic background noise is generated at the input of the speech coder COD, such that the speech coder will code this artificial noise. If a DTX functionality exists the coder COD will most likely enter the DTX mode and will start to produce SID frames (FIG. 2B).

Regarding a residual echo cancellation, the two alternatives I, II may be used to suppress residual echoes and hereinafter alternative one and two are termed residual echo suppression method of type I and type II, respectively.

Type I: Conversion to a SID frame FIG. 2C

Even when no speech is actually generated at the near end side, there is still the possibility that an echo and in particular a residual echo is present in the input signal to the speech coder COD. The fact that the residual echo is still present in the input signal to the speech coder can be exploited for the generation of background noise transmission codes. That is, the usage of an echo suppression method of type I will set the transmitting unit TR in a DTX mode of operation at times without near end speech and the residual echo as well as the background noise signal are used in the speech coder to form a speech frame.

In DTX mode the VAD indicates via the VAD flag VFLAG that only a Far End reception Signal is present in transmission signal TNE and consequently the speech frame is converted to a SID frame in a Make-SID frame device MSID of the MSIDM device shown in FIG. 1 (in dashed lines) and in FIG. 2C. The generation of transmit codes for the background noise on the basis of the residual echo (i.e. the remains of the received and acoustically coupled far end signal) is indeed possible since the spectral influence of the residual echo can be regarded negligible.

When on the far end receiving side the far end transceiver unit receives codes for the background noise which are formed on the basis of the residual echoes in the near end transmitting unit TR, then the excitation signal EX used to form the near end signal at the terminal of the far end transceiver unit in the DTX mode operation will still be a white noise generated by the pseudo random noise generator PNG (see FIG. 4). Therefore, the far end transceiver unit will actually not generate a residual echo but noise and thus the far end user will perceive the received signal in DTX mode operation as noise rather than a residual echo.

As shown in FIG. 4, the speech synthesis carried out in the speech decoder DECOD is based on two types of excitation signals, however, in the DTX mode operation only one excitation signal is used, i.e. the switch in FIG. 4 is controlled in position B by the switch signal FT output by the frame unpacking device FUD. This excitation signal is not in any way associated with the speech coding or background noise coding process carried out in the speech coder COD on the near end transceiver unit TRU.

Type II: Generation of Synthetic Background Noise (FIG. 2B)

Alternatively as in FIG. 2B, instead of using the residual echo in the speech coder COD for forming an estimate of the background process, it is also possible to generate a noise sequence which resembles the background noise when no near end speech activity is present.

As shown in FIG. 1 (in dashed lines) and in FIG. 2B, the transmitting unit TR comprises an additional noise generation means NGM including a noise generator NG generating a white noise and driving an AR model unit AR, a background estimation device BEST receiving the A/D converted version of the transmission signal TNE (including said echo signal) and controlling the parameters of said AR model in the AR model unit AR via a setting signal AR-PAR, a voice activity detector VAD receiving the subtractor output signal TNE' (including the residual echo) and outputting a control output no-talk NT to a switch SW2, and another switch SW1 controlled by the additional VAD output signal far-end-single-talk FEST for switching to said speech coder COD in a first switching state B an output from the echo canceller EC and in a second switching state A an output from said AR model unit AR. The device BEST is only operable in case of no near end and no far end speech in the signal TNE. Therefore, in case of NT true (no talk) the signal TNE is connected to the device BEST trough the closed position switch SW2 and in case of NT false (talk) the switch SW2 is open and the device BEST does not operate. The voice activity detector VAD can be incorporated in the coder COD, as shown in FIG. 3, or it can be provided outside of the coder COD.

Considering the devices in FIGS. 2A, 2-B and 2C in combination (e.g. in FIG. 1 the dashed boxes NGM and/or MSIDM are present) four different cases can be distinguished depending on whether or not there is a speech activity in the microphone MC and whether or not there is a coupling of the signal received from the far end into the signal TNE causing a residual echo in the output of the echo cancellor EC. The four cases are as follows:

1. There is near end speech as well as background noise present in the pulse code modulation (PCM) samples in the respective speech-frame. This corresponds to a situation of a normal speech with no additional echoes.

2. There is only background noise and no speech present in the PCM samples, i.e. the coder COD will enter the DTX mode of operation.
3. There is a near end speech pause and an echo and consequently a residual echo as well as background noise is present in the PCM samples.
4. There is near end speech, a residual echo of a signal received from the far end, and background noise present in the PCM samples.

In case 1 the switch SW1 shown in FIG. 2B and FIG. 2C is set in position B because the VAD signal FEST in false. In this case, a normal operation of the transmitting unit TR is commanded and the near end speech and the near end background noise is fed through the echo canceller EC and straight through to the speech coder COD. Since the VAD output signal NT is false (talk) the additional switch SW2 in FIG. 2B is an open position.

In case 2, the switches SW1 in FIG. 2B and FIG. 2C can assume position A or B and the VAD signal FEST is false. Preferably, the switches are in position B. The VAD output signal NT is true and thus in FIG. 2B the additional switch SW2 is in a closed position. In this condition, the device BEST operates and estimates the spectral characteristics of the TNE background signal.

In case 3, background noise from the microphone MC as well as a residual echo is present in the subtractor output signal TNE'. In case 3, the switch SW1 of FIGS. 2B and 2C is set to be in position A because the signal FEST is true. That is, in FIG. 2B the residual echo is not fed to the coder COD. However, the signal to the coder COD in FIGS. 2B and 2-C will be provided with a signal which mimics the background noise via the device NGM and/or the device MSIDM. It should however be noted, that only in case 2 the AR model of FIG. 2B is updated, possibly by using the output TNE' from the echo canceller EC. In FIG. 2C the coder COD does receive the residual echo along with the background noise signal. However since the switch SW1 is in position A, the speech frame will be manipulated by MSID so as to form a SID frame. To this end, it is understood that a DTX functionality is supported by the protocol. However, it should be pointed out that the unit MSID can manipulate a speech frame in a way such that the information related to the excitation signal EXS in FIG. 3 may be replaced with noise excitation. In this way a system without DTX functionality may use FIG. 2C. The VAD output signal NT is false and thus the additional switch SW2 in FIG. 2B is in an open position.

In case 4 the switch SW1 of FIGS. 2A and 2B is controlled to be in position B since the VAD signal FEST is false. The near end speech will mask the residual echo remaining in the output signal TNE' of the echo canceller EC. That is, when speech is present as well as the residual echo, the residual echo will be masked and there is no need for removal thereof. The VAD output signal NT is false and thus the additional switch SW2 in FIG. 2B is in an open position.

To summarize, if in any of the above cases 1.–4. the switch SW1 is in the position A, the coder COD will generate coding information (code words) which depending on the situation are based solely on the background noise or based on the background noise also including the echo or the residual echo.

Therefore, in the case of FIG. 2B (Type II), the speech coder COD receives a synthetic background noise signal generated by a synthetic noise generator NGM in the transmitting unit TR. When the speech coder COD detects such a synthetic background noise, the speech coder COD will automatically enter the DTX mode.

Some speech coder systems do not have a DTX functionality and therefore all frames will be speech coded. However, since no near end speech is detected the speech coder will code the background noise in terms of a speech frame and on the far end side the signal received contains no residual echo. Thus, in order to prevent a residual echo one possibility is to use a synthetic background signal at the input of the speech coder, provided no near end speech is present.

Prior Art V: Published Documents

The following published prior art documents can be referred to in terms of what has been described above.

In the U.S. Pat. No. 5,563,944 an echo cancellation device is described where an additional residual echo suppression device is provided downstream from a main echo cancellation device. This document therefore describes the preamble features of the attached claims 1, 14, 19. The residual echo suppression device estimates a residual echo level in a residual signal and produces a threshold signal with a threshold level equal to the residual echo level. A residual echo suppressor is provided for adaptively controlling a suppression amount for the residual echo based on the threshold signal supplied from the residual echo level estimator. Thus, a residual echo suppression is carried out downstream from the main echo cancellation based on a threshold level determination of the echo signal.

The European patent application EP 0 884 886 A2 describes an echo cancellor employing a multiple step gain. Here, a noise cancellation means acts as a kind of residual error suppression device as in the preamble of claims 1, 14, 19. The noise cancellation means estimates signal components due to the local background noise and removes these noise components from the outgoing signal. This noise cancellation means employs any of various well-known noise cancellation methods, such as a spectral subtraction, band splitting attenuation or adaptive filtering.

In the patent abstracts of Japan JP 63-42527 a cascaded echo cancellation arrangement is disclosed. Between two echo cancellation stages an equalizer is provided which performs an equalization of the wave-form distortion due to line characteristics. A subtractor subtracts the approximate echo component from the equalized reception signal which is output by the equalizer in order to cancel an echo component. Thus, the wave form distortion is equalized and the echo component is cancelled when the transmission signal of the other party is output to a reception terminal.

The U.S. Pat. No. 5,721,730 describes a residual echo cancellation by attenuating the subband error signals on an independent basis in response to a comparison of the relative levels of the corresponding subband send-input signals, suband receive-input signals and subband error signals. Thus, in this echo canceller an injected noise component is more accurately related to the prevailing noise spectrum within the transmitted signal.

The U.S. Pat. No. 5,283,784 relates to a residual echo cancellation by comparing relative levels of the sent input signal, the received input signal and an error signal remaining after removal of an expected echo signal from the sent input signal. Thus, a residual echo from an echo canceller circuit is reduced by a variable attenuator. It is also described that a non-linear processor or center clipper removes any residual echo that remains in the output signal after subtraction of the anticipated echo and is arranged to remove residual echoes in the output resulting from the far end speaker's signal and to pass the signal of the near end speaker without distortion. This non-linear processor avoids a sudden and noticeable variation in the output of the echo cancellor by removing residual echoes proportionally rather than by operation above a threshold signal level. The non-linear processor detects the average background noise level and proportionally injects a noise signal in the output to maintain the average level not withstanding the variation in operation of the non-linear processor which occurs with the presence or absence of a signal from the near end speaker and the far end speaker, respectively.

The U.S. Pat. Nos. 5,222,251 and 5,646,991 disclose echo cancellation devices which also exploit the speech coder characteristics for a residual echo cancellation. In this respect these documents have some relationship with the above described FIG. 2B.

In the context of FIG. 2B, U.S. Pat. No. 5,222,251 discloses that the acoustic echo should be replaced with at least one codeword generated by a communication device wherein said codeword represents an energy and a spectral content of the ambient noise, i.e. the background noise. However, this patent does not disclose which code-word is meant, i.e. whether it is the code-word of the PCM coding apparatus or a code-word of the GSM speech coder, i.e. the coder COD shown in FIG. 3. U.S. Pat. No. 5,222,251 also discloses a method for residual echo cancellation where it is decided if speech is transmitted in the transmitting unit TR and a threshold is computed. If the acoustic echo is smaller than the generated threshold, the code-word is replaced. The threshold may also be compensated for losses due to AEC.

Furthermore, in the context of FIG. 2B, U.S. Pat. No. 5,646,991 discloses different noise generation means in order to impress a synthesized noise replacement signal upon the output signal of an echo cancellor when background noise is present in the transmitting signal. In this patent a spectral response means is provided responsive to a far end speech absence signal and a near end speech absence signal and receives a noise signal from an output speech channel for determining in accordance with a predefined spectral response formant a spectral response characteristic. A noise generator means is responsive to said near end speech absence signal and to said far end speech present signal for generating a synthesized noise replacement signal in accordance with the spectral response characteristic. The noise generator means switchably impresses this synthesized noise replacement signal upon the output speech channel. According to another alternative in this patent, a spectral response means is responsive to said far end speech absence signal and to said near end speech absence signal for receiving the noise signal and determines in accordance with a predetermined spectral response formant a spectral response characteristic. A noise generator means is responsive to said near end speech absence signal and to said far end speech present signal for generating a synthesized noise replacement signal in accordance with the spectral response characteristic and the noise magnitude.

SUMMARY OF THE INVENTION

As explained above, in conventional residual echo cancellation devices additional noise generation procedures are used to produce modified code-words at the input is of the speech coder COD in order to get rid of the residual echo when a background noise is present or is not present and when speech is present or is not present. On the other hand, the typical use of residual echo cancellation devices relying on center clippers which are non-linear elements results in the disadvantage that undesired distortions are introduced in the signal transmitted to the far end. Most importantly, as shown in FIGS. 2B and 2-C, in conventional echo cancellers the signal to be transmitted bypasses the echo canceller and synthetic noise in generated to be transmitted to the coder COD. However, this noise generation does not relate directly to the actual microphone signal content and it is not related at all to the received signal or a signal output like TNE' of the echo canceller. When the VAD malfunctions, i.e. either it does not detect the renewed generation of speech in the signal TNE or it does not detect the absence of speech quickly enough, then the user at the far end will either hear noise and not the actual speech or the user will first hear a speech frame coded actual background noise (including possible residual echoes) and subsequently the artificial noise thus exposing the user to two different kinds of noise phenomena.

OBJECT OF THE INVENTION

Therefore, the object of the present invention is to provide an efficient echo cancellation device which performs an efficient cancellation of residual echoes without bypassing the echo canceller during presence and/or absence of speech.

SOLUTION OF THE INVENTION

According to a first aspect of the invention, this object is solved by an echo cancellation device (claim 1) for cancelling echoes caused by a coupling of a reception signal received by a receiving unit of a transceiver unit of a telecommunication system to a transmitting unit thereof, comprising a transfer function estimator adapted to estimate the coupling transfer function from the receiving unit to the transmitting unit and for processing the reception signal with said estimated coupling transfer function, a substractor adapted to subtract from the transmission signal which includes an echo signal due to the coupling of the received signal to the transmitting unit the processed reception signal, and a residual echo suppression device for suppressing residual echoes in the subtractor output signal, wherein said residual echo suppression device comprises a residual echo filter having an adjustable filter function adapted to remove from the subtractor output signal of the substractor the spectral characteristics relating to the reception signal.

According to a second aspect of the invention, this object is solved by an echo cancellation device (claim 14) for cancelling echoes caused by a coupling of a reception signal received by a receiving unit of a transceiver unit of a telecommunication system to a transmitting unit thereof, comprising transfer function estimator adapted to estimate the coupling transfer function from the receiving unit to the transmitting unit and for processing the reception signal with said estimated coupling transfer function, a subtractor adapted to subtract from the transmission signal which includes an echo signal due to the coupling of the received signal to the transmitting unit the processed reception signal, and a residual echo suppression device for suppressing residual echoes in the subtractor output signal, wherein said residual echo suppression device comprises a residual echo filter having an adjustable filter function adapted to amplify in the subtractor output signal of the subtractor the spectral content of the background signal in the transmission signal transmitted by said transmitting unit.

According to a third aspect of the invention, this object is solved by an echo cancellation device (claim 19) for canceling echoes caused by a coupling of a reception signal received by a receiving unit of a transceiver unit of a telecommunication system (TELE) to a transmitting unit thereof, comprising a transfer function estimator adapted to estimate the coupling transfer function from the receiving unit to the transmitting unit and for processing the reception signal with said estimated coupling transfer function, a subtractor adapted to subtract from the transmission signal which includes an echo signal due to the coupling of the received signal to the transmitting unit the processed reception signal, and a residual echo suppression device for suppressing residual echoes in the subtractor output signal, wherein said residual echo suppression device comprises a residual echo filter having an adjustable filter function and a noise generation means adapted to add noise in the filter output signal in a spectral region relating to the reception signal for masking residual echoes.

Further Advantageous Embodiments

The above described aspects of the present invention can also be used in combination. That is, the first and second aspect, the first and third aspect, the second and third aspect and the first, second and third aspect may be combined. Further advantageous embodiments and improvements of the invention can be taken from the attached dependent claims. It should also be noted that the invention can comprise embodiments resulting from a combination of features separately claimed in the claims and/or described in the specification including the features described as background of the invention or prior art in the aforementioned introduction even if such prior art only refers to an internal state of the art of the applicant.

Hereinafter, the embodiments of the invention will be illustrated with reference to the attached drawings.

BRIEF DESCRIPTION OF THE DRAWINGS

FIG. 2B shows a principle block diagram of an echo cancellation device EC according to a prior art 1 having a residual echo cancellation approach of type II where an additional noise generation takes place;

FIG. 2C shows a principle block diagram of an echo cancellation device EC according to a prior art IV having a residual echo cancellation approach of type I where a SID frame is generated during background noise detection;

FIG. 3 shows a block diagram of a conventional speech coder COD according to a prior art 11 and as shown in FIG. 1;

FIG. 4 shows a block diagram of a conventional speech decoder COD according to a prior art II and as shown in FIG. 1;

It should be noted that in the drawings the same or similar reference numerals denote the same or similar parts and steps throughout the drawings.

PRINCIPLE OF THE INVENTION

Figure 5:
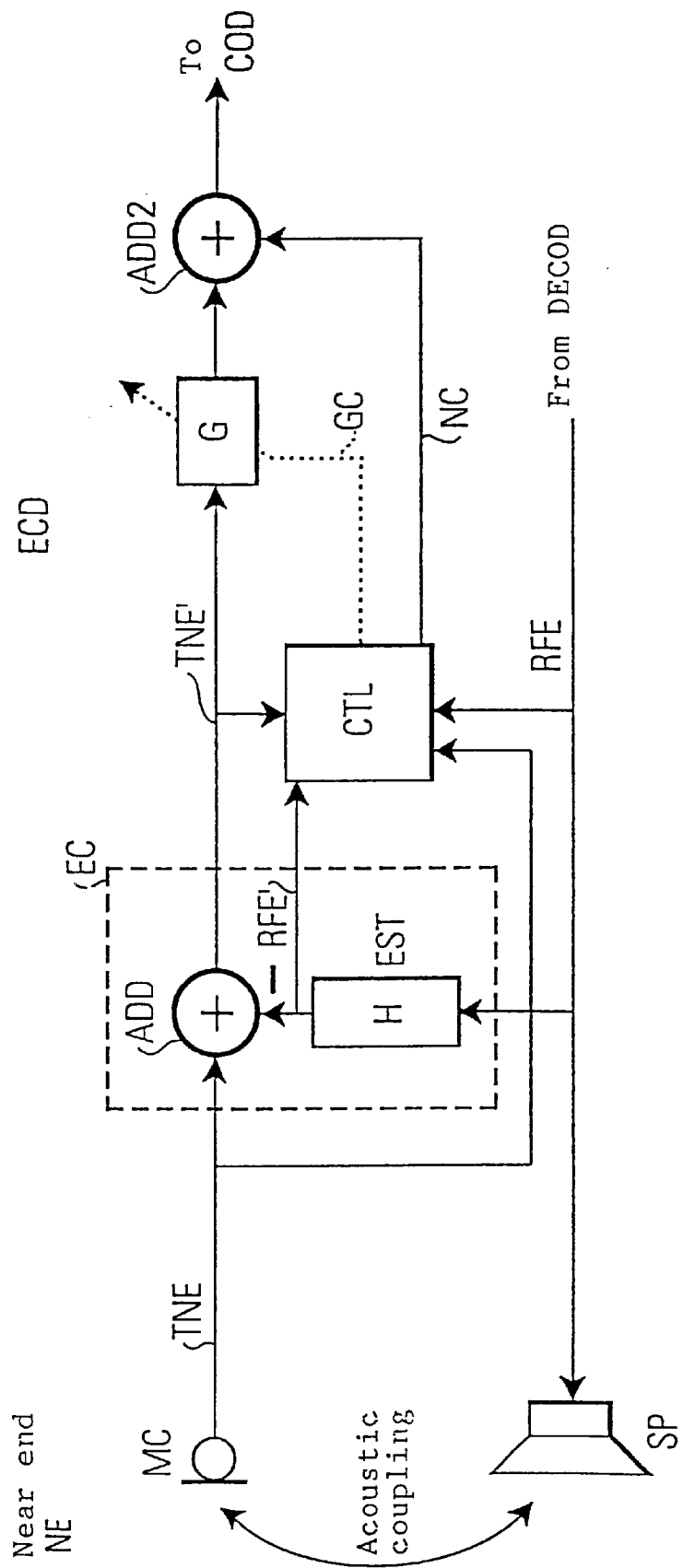
FIG. 5 shows a block diagram of an echo cancellation device EC according to the principle of the present invention.

FIG. 5 shows a block diagram of an echo cancellation device ECD according to the principle of the present invention. This echo cancellation device ECD comprises an echo canceller EC as in FIG. 1 and FIG. 2A and additionally a control means CTL, an adaptive filter G and optionally an additional adder ADD2. This echo cancellation device ECD can be used in the transceiver unit TRU in FIG. 1 and produces an output which is fed to the coder COD, wherein the blocks of the prior art according to FIG. 2B and FIG. 2C shown in dashed lines in FIG. 1 may not be present.

Figure 2A:
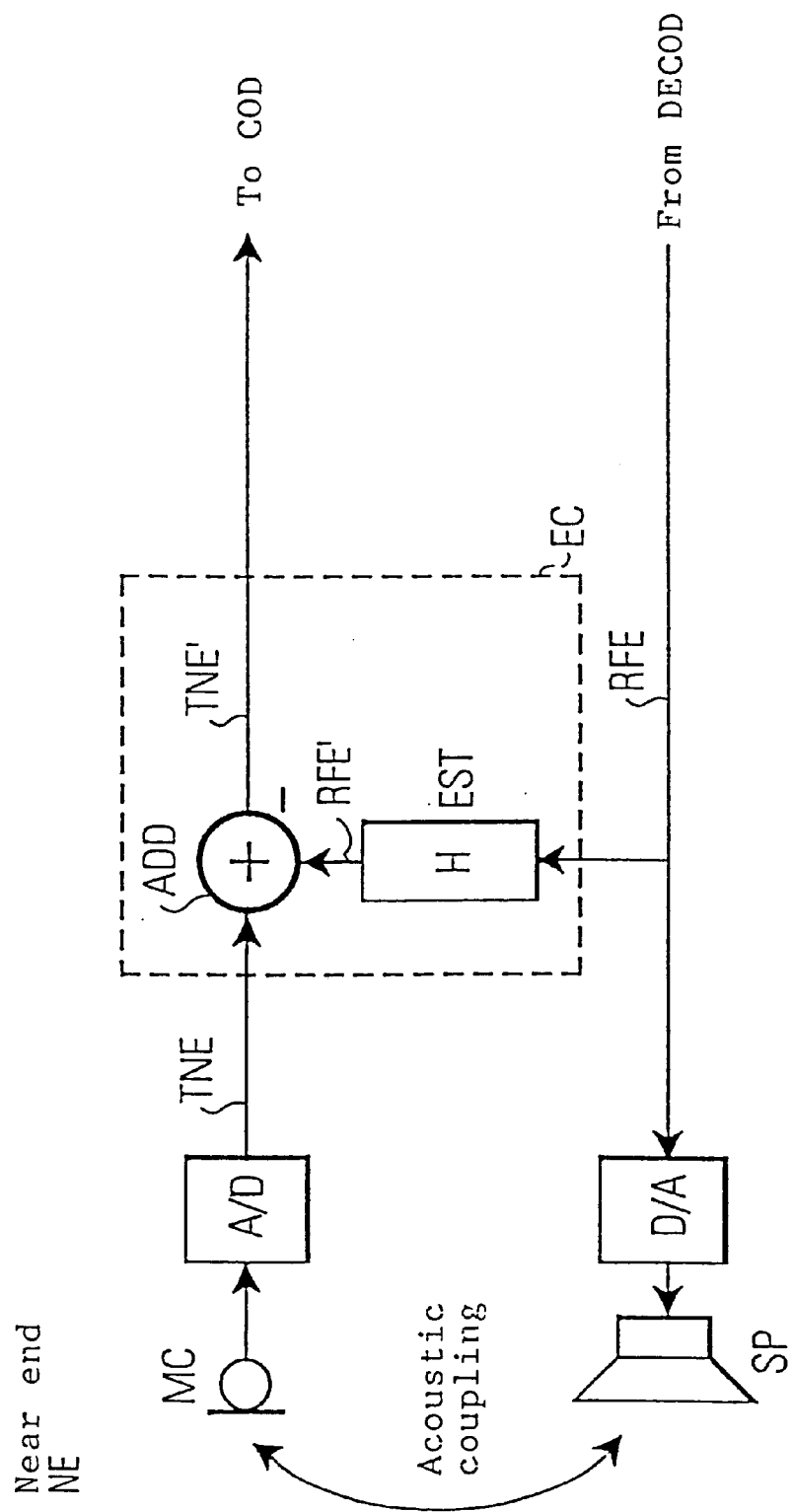
FIG. 2A shows a principle block diagram of an echo cancellation device EC according to a prior art 1 without a residual echo canceling method.

As is clear from FIG. 5, the microphone signal TNE always passes through the echo canceller EC and additional units G and optionally ADD2 are provided downstream of the echo canceller EC (having the principle configuration as in FIG. 2A to perform the residual echo cancellation of residual echoes in the output signal TNE' of the echo canceller EC. In particular, there is no bypassing of the echo canceller EC as e.g. in FIG. 2B under certain conditions. The adder ADD2 is optionally used in some embodiments as will be explained below.

FIRST EMBODIMENT OF THE INVENTION

Figure 5A:
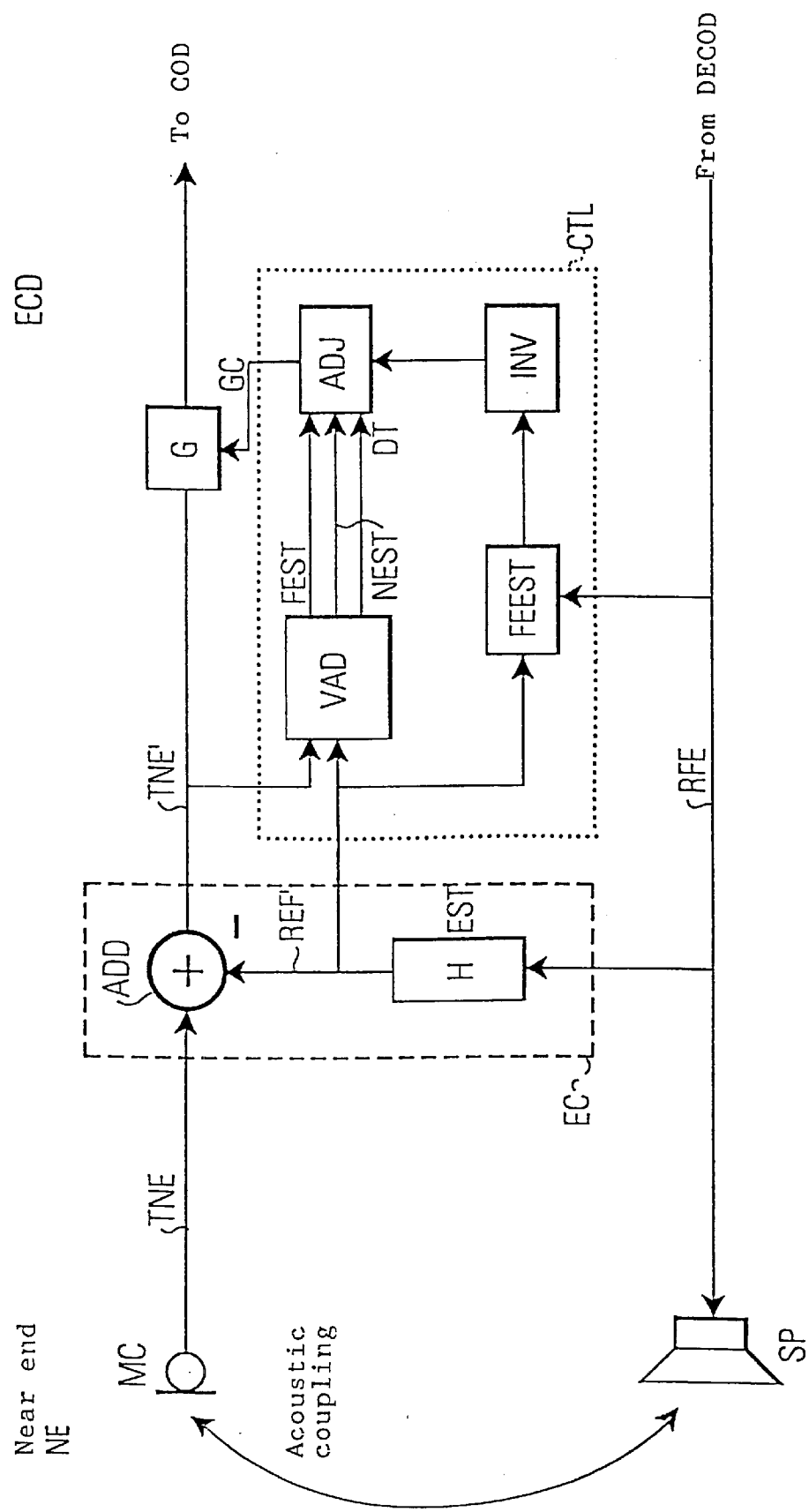
FIG. 5A shows a block diagram of an echo cancellation device EC according to the first embodiment of the present invention.

FIGS. 5 and 5A shows an echo cancellation device ECD according to a first embodiment of the invention. As shown in FIG. 5A, in this first embodiment the adder ADD2 is not used. However, as can be seen from a comparison with FIG. 1 and FIG. 2A, the first embodiment shown in FIG. 5A in connection with FIG. 5 comprises in addition to the transfer function estimator EST, H and the subtractor ADD an additional residual echo suppression device G for suppressing residual echoes in the subtractor output signal TNE'.

In the first embodiment, the residual echo suppression device G comprises a residual echo filter G having an adjustable filter function g adapted to remove from the subtractor output signal TNE' of the subtractor ADD the spectral characteristics relating to the reception signal RFE. The control means CTL according to the first embodiment is provided to adjust the filter function g of the residual echo filter G via a setting signal GC. Therefore, in the first embodiment the control means CTL operates as a spectral content determining means adapted to receive said reception signal RFE and/or said transmission signal TNE including said echo signal due to the coupling of the received signal RFE to the transmitting unit TR and/or said processed reception signal RFE' and/or the subtractor output signal TNE'.

The spectral content determining means constituted by the control means CTL determines the spectral content relating to the reception signal RFE on the basis of one or more of these signals and on the basis of this determination sets the filter function g of the residual echo filter G in accordance with the determined spectral content. It should be noted that the spectral content determining means CTL can determine the spectral content relating to the residual echo on the basis of any of the four signals input to the spectral content determining means CTL. However, if the spectral content determining means CTL determines the spectral content on the basis of the transmission signal TNE and/or the subtractor output signal TNE', it only does so when a voice activity detector VAD does not detect any near end voice activity in these signals.

The residual echo filter G is a digital filter whose filter characteristic can be adjusted by a set of adjustable filter parameters as is well-known to the skilled person in the art of digital filter design. Therefore, any further explanations as to how the filter function in the digital filter can be set by means of a set of parameters is omitted here. Without being limited thereto, a filter model which can be used will be described below.

The purpose of the spectral content determining means is to monitor at least one of the signals entering the unit. Preferably, the far end signal spectral content is determined on the basis of the signal RFE' such that the determined spectral content will be close to that of the residual echo signal. Before giving further examples as to how the spectral content determining means determines the spectral content, some general steps of the method of the first embodiment shown in FIG. 5 will be considered.

In a first step for the attenuation of the far end signal, i.e. the residual echo in the output TNE' of the adder ADD, least one signal relating to the far end signal RFE is taken, preferably REF or REF'. This signal is hereinafter denoted with "X".

In a second step a model of the spectral content of the selected signal X is computed by the spectral content determining means CTL. This model of the spectral content is denoted with "A" and can be determined on the basis of a) a parametric approach, e.g. by an estimation of parameters in a AR-(AutoRegressive), ARX-(Auto-Regressive eXogenous), a ARMA-(AutoRegressive Moving-Average) model or other similar models; and b) a non-parametric approach, e.g. by means of a Fourier Transform (in particular a Discrete Fourier Transform), a wavelet transform etc.

In a third step, the spectral content determining means CTL computes an inverse of the model A. The inverse of A is denoted "G".

In a fourth step, the spectral content determining means will adjust the filter function g to correspond to the inverse model G.

It will be appreciated that all signals RFE, REF', TNE, TNE' which can be used for the estimation of the spectral content are occurring in the echo cancellation device EC on a frame-basis. Therefore, a new inverse model G and thus a new filter transfer function g is obtained on a sample-basis or a frame-basis, i.e. a new G, g is obtained at every sample or frame. However, it is also sufficient if only every N-th sample a new g, G is calculated. N can be any number selected by the designer.

When double-talk occurs (speech in both the transmission signal TNE and the reception signal RFE), a double-talk detector can be used (for example in FIG. 5A the VAD double-talk signal DT instructing the adjustment unit ADJ to change G accordingly) in order to bypass the filter G. That is, when the double-talk detector detects a substantial double-talk (meaning that RFE and TNE contain speech), the filter G can be made to G=1, such that all frequencies will be passed.

It should be noted that of course in principle the filter G is not needed when there is no far end signal RFE. When the far end signal RFE is quiet, the far end signal RFE will have a low energy/power level. In this case, the spectral content determining means obviously derives a filter model G which will cause the filter G to be a constant or close to a unity filter. In any other case, energy is emitted by the loudspeaker and is as such part of the acoustic loop and will hence be reduced by G.

It is clear from FIG. 5 that the inverse filtering with G attenuating the far end signal which removes the spectral content linked to the far end signal requires no modification of the speech codes such that the background signal is synthesized.

Spectral Estimation: Using an Adaptive Parametric Model

It is well known that theory developed for the purpose of system identification is often based on stochastic assumptions. Therefore, the derivation of the spectral content can be based on the assumption that all signals are stationary random processes.

Figure 7:
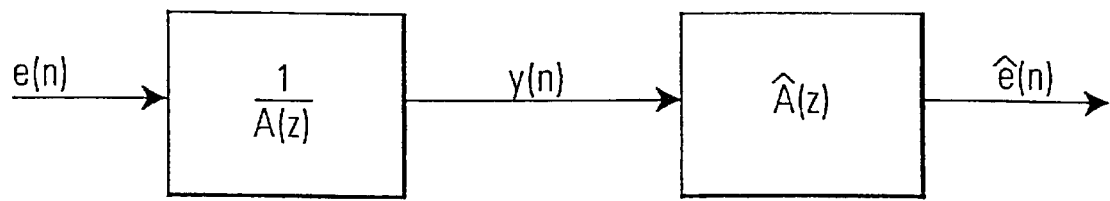
FIG. 7 shows a black box representation of an AR-process.

In FIG. 7, which shows a black box representation of an AR-process, a white noise e(n) is driving an all pole system $A^{-1}(z)$ so as to produce an output signal y(n). In this context only the output signal y(n) is observable. For FIG. 5 or FIG. 5A the output signal y(n) corresponds to RFE or RFE' (or any of the signals TNE, TNE' used for determining the spectral content). Moreover, it may also be said that the filter $A^{-1}(z)$ can be regarded as the vocal tract filter of the far end speaker. Hence, y(n) may be the signal RFE. Evidently, the signal e(n) is the far end excitation.

In order to determine the spectral content, it is necessary to identify the system generating the output signal y(n). obviously, some model can be assumed which—given a white noise input sequence—produces an output capable of describing the observed behaviour of the observed signal y(n). To illuminate the identification approach it can be assumed that the output y(n) is an AR-process, which is often used as a model for the vocal tract. The output signal is fed into an identification block in which the aim is to obtain an output being white.

The black box representation of an AR-process depicted in FIG. 7 will hereafter be used to describe the identification. The AR-process y(n) is created by an all pole system $A^{-1}(z)$ driven by a white noise process e(n). To identify $A^{-1}(z)$ an all zero system Â(z) is used. That is, ideally the zeros will cancel the poles of the unknown system and consequently e(n) is obtained.

The unknown AR-process may be defined as $$y(n) = \sum_{k=1}^{M} a_k y(n-k) + e(n) = \frac{e(n)}{A(q)} = \frac{e(n)}{1 - \sum_{k=1}^{M} a_k q^{-k}}, \quad (1)$$

where q is the unit time shift operator. Now the aim is to find an estimate of y(n) which is denoted by ŷ(n). Since it is assumed that the observed process y(n) is an AR-process the quantity ê(n)=y(n)−ŷ(n;a) is adjusted such that ê(n) will be a white process like e(n). The adjustment is controlled by a set of parameters contained in the vector $$a^T = [\alpha_1 \ldots \alpha_M]. \quad (2)$$

In principle the signal ê(n) can be found by filtering y(n) by $$\hat{A}(q; a) = 1 - \sum_{m=1}^{M} \alpha_m q^{-m}. \quad (3)$$

Note that by using the operator Â(q;a) on y(n) the sum in Eq. (3) can be interpreted as the prediction of y(n) based on values of the process y(n) observed up to time n−1.

Figure 1:
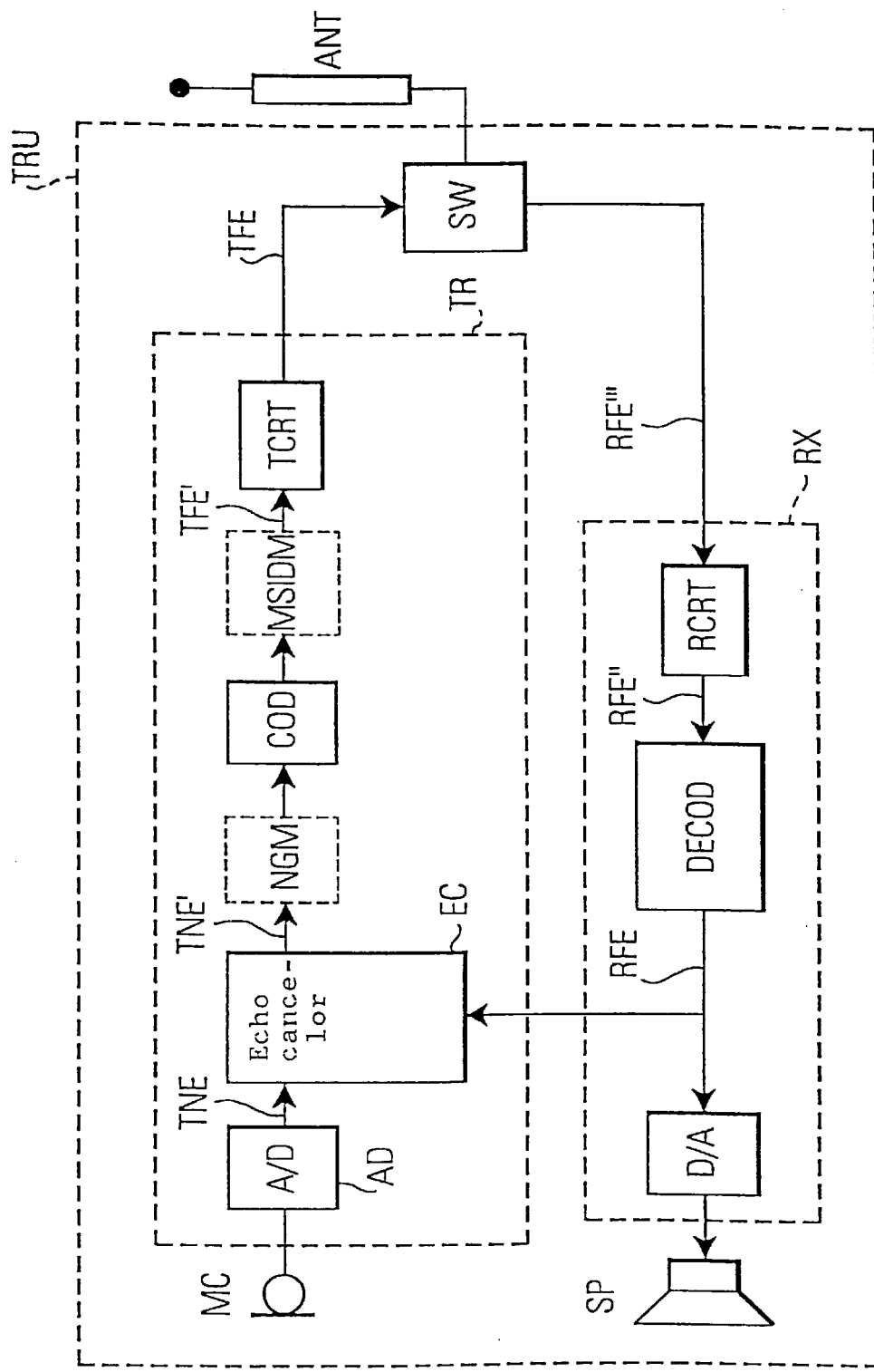
FIG. 1 shows a conventional transceiver unit TRU according to the background of the invention.

Here, Â(q;a) corresponds to the filter G depicted in FIGS. 5-0 and 5-1.

Consequently, the model structure chosen (here AR) together with the estimated parameters a is a description of the spectral content of y(n). That is, replacing the shift operator in Eq. (1) and evaluating the left-hand side actually corresponds to the Fourier transform of y(n).

However a Fourier transform of a stochastic process may be theoretically hard to define. Therefore, the spectrum of a stochastic process is defined in terms of the auto correlation function. Nevertheless, as seen in Eq. (1) by filtering y(n) with A(q) all spectral information can thus be removed.

The estimation of the filter parameters is straight forward, see for example the aforementioned reference by Proakis and Manolakis. In fact, a similar estimation is made within the speech coder. The approach taken in the speech coder is a block based version. However, the estimation can also be solved by a gradient search such as the Least Mean Square (LMS) algorithm. To explain the procedure, a brief derivation of the necessary equations will follow. The objective, given an input signal y(n), is to minimize the energy in the signal. That is, minimize $$V(a)=E\{(y(n)-\hat{y}(n;a))^2\} \quad (4)$$

where y(n) is the estimated signal given the samples up to time n−1. The minimum of equation (4) will be the variance of a white processes. Moreover, it is a linear problem which ensures that there is one global minimum. The parameters are found by solving a linear system of equations defined by $\partial V(a)/\partial a=0$. The LMS search exploits the gradient in a recursive parameter update which w ill stop when the gradient is zero, see S. Haykin. *Adaptive Filter Theory.* Prentice Hall, Englewood Cliffs, N.J., 1991; P. E. Gill, W. Murray, and M. H. Wright. Practical Optimization. Academic Press, London 1981. That is, $$a(n) = a(n-1) - \mu \frac{\partial V(a(n-1))}{\partial a}, \quad (5)$$

where $\mu$ attenuates the decent direction. It is common knowledge that the attenuation is often necessary in order to maintain the stability of the recursive equation (5), S. Haykin. *Adaptive Filter Theory.* Prentice-Hall, Englewood Cliffs, N.J., 1991. Furthermore, in the LMS the expected value is replaced with the instantaneous approximation $$a(n)=a(a-1)-\mu y(n-1(y(n)-y(n-1)a^T), \quad (6)$$

where $$y^T(n-1)=[y(n-1), \ldots, y(n-M-1)].$$

As already pointed out the model can be computed using a block or sample based approach. Asymptotically, the approaches are equal. However, the sample based approach may be somewhat more suited for fix point implementation. The block based approach is not too complicated to implement provided the correlation method is used, which will ensure a symmetric Toeplitz structure.

In principle the spectral determination of RFE or RFE' maybe done as described a above. As already pointed out above, the observed signal y(n) corresponds to RFE or RFE' and Â(q;a) corresponds to the filter G depicted in FIGS. 5 and 5A. Note that the spectral determination is here made implicitly by fitting data to a model.

Interpolation of Parametric G Model

By taking one or more of the above signals, the filter G will attenuate all frequencies related to the far end signal. Obviously, in double-talk situations, the attenuation will also effect the near end speech. However, since the near end and the far end speech can be regarded as statistically independent processes/signals, the effect can be made (by updating the G filter in a special way by selecting the number N) hard to hear. For example, it is assumed that the parameters of filter G are computed every frame. To avoid sudden transition, in the signal to be transmitted, due to changing the parameters in G, a smoothing approach can be used. One method of accomplishing the smoothing is to proceed as follows:

S1. $G_{old}(q)=0$
S2. Compute the reflection coefficients of the filter $G_{old}(q)$
S3. Compute the reflection coefficients of the filter $G_{new}(q)$ based on a new input frame (e.g. 160 samples).
S4. Determine a straight line between corresponding reflection coefficient of the filter $G_{old}(q)$ and $G_{new}(q)$.
S5. Select for example K=4 points on the line including the endpoints, i.e. two additional sets of reflection coefficients. Denote the set of reflection coefficients by $\Gamma_\beta$ where $\beta=1, \ldots, K$. Note that the sets are ordered with respect to the point on the line ranging from $G_{old}(q)$ to $G_{new}(q)$.
S6. Filter the first N/K samples using the first set of reflection coefficients, i.e. corresponding to $G_{old}(q)$
S7. Filter the $\beta$N/K samples using the sets $\Gamma_\beta$, where $\beta=2, \ldots, K$.
S8. Let $G_{old}(q)=G_{new}(q)$ and proceed with step S2.

The above procedure corresponds approximately to evaluating a new filter on a sub frame base consisting of N/K samples.

The benefit with the above procedure is that it requires less computation than does the exact determination of a filter based on a sub frame.

Spectral Estimation: Using an Adaptive Non-Parametric Model

Hereinafter, an example of using a non-parametric approach using Discrete Fourier Transforms for determining the spectral content will be described. The spectral content determining means CNT uses one of the signals RFE, RFE', TNE, TNE' and preferably the signal TNE' or TNE containing the residual echo. As explained above, when using the signals TNE, TNE' the voice activity detector VAD is needed such that the filter function calculation will only be carried out in speech pauses of the near end signal.

Thus, the determining means CTL determines a Discrete Fourier Transform DFT, e.g. of the subtractor output signal TNE' including said residual echo signal or of said transmission signal TNE including said echo signal and a Discrete Fourier Transform DFT of said reception signal RFE and adjusts the filter parameters on the basis of a subtraction of a scaled version of said Discrete Fourier Transform DFT of said reception signal RFE from said Discrete Fourier Transform DFT of said transmission signal TNE including said echo signal or from said Discrete Fourier Transform DFT of said subtractor output signal TNE' including said residual echo signal. That is, in mathematical terms this subtraction corresponds to:

$$T(\omega_i)=M(\omega_i)-\alpha X(\omega_i), \quad (7)$$

where $\omega_i$ and $\alpha$ denote the i-th frequency of the Discrete Fourier Transform DFT and the scale factor respectively. As afore mentioned, the signals M and X in equation (1) correspond to the Discrete Fourier Transform of the signal containing the residual echo (TNE' or TNE) and the far end signal (RFE), respectively. Equation (5) can be reorganized as follows:

$$T(\omega_i) = M(\omega_i)\left(1 - \alpha \frac{X(\omega_i)}{M(\omega_i)}\right) = M(\omega_i)G(\omega_i). \quad (8)$$

It can be seen from equation (6) that the desired filter function G in the Fourier Domain is:

$$G(\omega_i) = 1 - \alpha \frac{X(\omega_i)}{M(\omega_i)}. \quad (9)$$

Equation (5) or (6) are closely related to the parametric approach in which a transfer function is estimated, e.g. by an autoregressive exogenous (ARX) model. Such models which can be used for estimating the filter function are for example described by T. Söderström and P. Stoika, *system identification,* Prentice-Hall International, London, UK, 1998. For those skilled in the art of signal processing and system identification it is clear that a range of the methods can be used to estimate the information required to cancel the spectral content of the residual echo based on the afore mentioned embodiment. Therefore, what has been described above should only be taken as a presently perceived best mode of the invention as conceived by the inventors. The central idea is to explore the fact that the far end signal is known and can as such be used to attenuate in the signal TNE' those spectral lines which relate to the far end signal RFE. Therefore, the residual echo is completely suppressed by the filter G.

The Setting of G and Voice Activity Detection

As described above, the first embodiment is based on the special technical feature that no modification of the speech codes is necessary, such that the background signal is synthesized.

As mentioned above, if the signal TNE or signal TNE' is used for the estimation of the spectral content relating to the receiving signal RFE, it is necessary to make sure that this is only done when no near end signal from the microphone MC is present, i.e. when there is no speech by the speaker of the near end transceiver unit TRU. Therefore, the VAD detector as shown in FIG. 5A is needed such that the spectral content determining means will only operate to calculate a new filter function g, G in near end speech pauses.

In FIG. 5A, the first embodiment is depicted. The unit Far End ESTimator FEEST acting as a part of the spectral content determining means estimates the spectral characteristics of the far end side signal, for example using Eq. (1)–(6). In FIG. 5A the signal REF' is used because it is close to the characteristics of the far end signal in TNE. The unit termed INV is more or less inserted to indicate that an inverse model of the far end spectral characteristic is to be used. It should be clear that in fact the inverse model is explicitly obtained by using a system identification approach as indicated by Eq. (3) and is in principle available from the DECOD device as the coefficients used in the filter VTF as shown in FIG. 4. Thus, the devices FEEST and INV form the spectral content determining means and the adjustment unit ADJ is provided to set the determined filter coefficients of the filter G via the setting signal GC.

The usage of the VAD detector is optional, i.e. not necessarily needed. However, it improves the performance. In principle the VAD exploits two signals in order to determine Double Talk (DT) and Far End Single Talk (FEST). The inputs to the VAD are signals related to the far and near end speaker. Note that one may use REF instead of REF' and TNE instead of TNE'. The reason for using TNE' and REF' is that TNE' does not contain a strong far end signal (most near end signal exist) and REF' is close to a replica of the far end signal in TNE. Thus, the detector VAD outputs FEST if the signal TNE only contains far end speech and the detector VAD outputs DT if TNE contains both far end and near end speech simultaneously. Finally, the VAD outputs NEST if only near end speech is present.

The three outputs FEST, NEST and DT of the detector VAD are sent to the box ADJ which is responsible for transferring the filter parameters to G. Moreover ADJ is also responsible for smoothing parameters according to what has been described above. The flags from the detector VAD can be used by ADJ as follows.

In case of only near end speech, i.e. NEST is true and DT and FEST are false, no filtering is to be done and consequently the adjustment may force the model intended for G to unity. Moreover, it may also do this for double talk, i.e. DT is true and FEST and NEST are false, such that the residual echo is masked by the near end speaker. Finally, gain as function of frequency may also be adjusted based on the signals in the VAD. For example if it is assumed that the model is parametric, then the gain as function of frequency may be altered by moving the roots radial with respect to the z-domain unit circle. The reason for doing this is that a VAD detector may indicate a continuous measure (i.e. a probability and not a binary variable taking the values 0 and 1) of talk and full filtering is to be done when only a residual echo occurs in TNE'. When the near end starts or stops the gain can be gradually moved from full gain to unity and from unity to full gain, respectively. Thus, the box ADJ will—based on the signals DT, FEST and NEST—adjust the radial position of the roots of G as described above during the transitions from FEST to DT and DT to FEST and during the transitions of NEST to FEST and FEST to NEST.

SECOND EMBODIMENT OF THE INVENTION

The second embodiment is also based on the general configuration as shown in FIG. 5. In the second embodiment the residual echo suppression device G comprises a residual echo filter G having an adjustable filter function g adapted to emphasize in the subtractor output signal TNE' of the subtractor ADD a background signal spectral content of the transmission signal in speech pauses. For this purpose the control means CNT contains a background signal model determining means which uses—as in the first embodiment—one or more of the signals TNE, TNE' for estimating a background signal model on the basis of one or more of these signals. When the background signal model has been determined, the background signal model determining means CNT sets the filter function g of the residual echo filter G in accordance with the determined background signal model such that the background signal spectral content is emphasized.

Figure 5B:
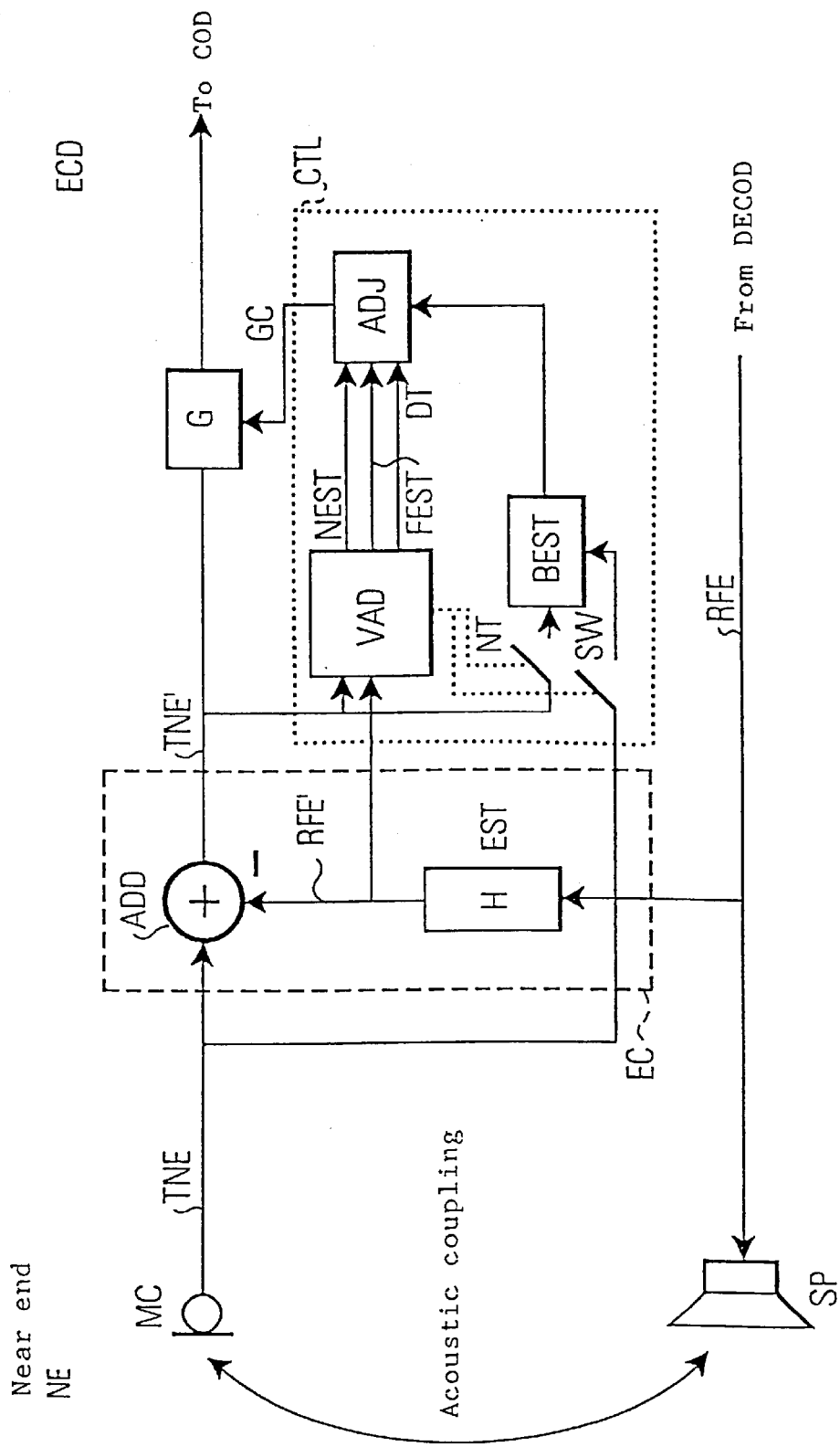
FIG. 5B shows a block diagram of an echo cancellation device EC according to the second embodiment of the present invention.

When the near end signal TNE is used for the determination of the background noise model, a VAD detector schematically shown in FIG. 5B is used such that the background noise model is only determined in speech pauses. To this end, the detector VAD receives the subtractor input signal REF' and the subtractor output signal TNE' and detects when there is no speech in both of these signals. If yes, the VAD outputs a true value in the no-talk-signal NT and thus the switch SW is closed. Consequently, the signal TNE or TNE' is used for the background spectral estimation in the background sDectral estimation means BEST. When no far end speech is present, the signals TNE and TNE' may be used in order to determine the model for the background noise. However, the obtained model is for the case that the far end signal is active. That is, in the speech pauses the model is determined, however it is used in the speech pauses as well as in the speech intervals. Therefore, in the method of the second embodiment, the following steps are carried out:

1. a signal is taken which is related to the background signal, e.g. preferably TNE or TNE' when the VAD detector outputs NT (no speech is present). This signal is denoted with "Y".
2. A model of the spectral content of the selected signal Y is computed in the background spectral content estimation means BEST as in the first embodiment on the basis of:
   a) a parametric approach, e.g. an estimation of parameters in an AR-,ARX-,ARMA-model, etc.; and/or
   b) a non-parametric approach, e.g. a Fourier Transform, a wavelet transform, etc.
This model of the background noise is denoted "G".
3. The filter function g is set via the adjustment unit ADJ on the basis of G and the signal TNE' is filtered in the filter G.

As explained above, the signals in the second embodiment occur on a sample-basis or frame-basis and the background noise model determination and computing of the filter transfer function G, g is only performed in frames in which no speech is present for the far end signal RFE and the near end signal TNE. However, the emphasizing of the background noise on the basis of the adjusted filter is performed in all frames, in particular also in the speech frames.

By having determined the background noise model on the basis of one or more of the above described signals, the adjusted filter function will amplify all frequencies relating to the background noise spectrum. Thus, frequencies related to the far end signal RFE will be attenuated unless the far end signal RFE has the same spectral content as the background noise. However, a speech signal is time varying and consequently the speech spectrum is also varying. Thus, the speech signal will be attenuated. Consequently, the residual echo is not emphasized in any systematic way and the ratio of the background signal to the residual far end signal will increase. In this context, it is likely that one of the two events may occur in connection with DTX mode of operation as described with reference to FIG. 2A, FIG. 2B, namely:

1. a DTX mode of operation of the speech coder will be initiated due to the emphasizing of the background noise in frames which contain no speech; and
2. the residual far end signal is masked by the amplification of frequencies related to the background process in frames containing speech.

It may also be noted that an improved version of the second embodiment may also include a long term predictor for carrying out a long term prediction of the far end signal so as to remove remains of voiced excitation.

From the above description of the second embodiment it will be appreciated that also in the second embodiment there is no modification of code words at the output of the echo cancellor EC and the special technical feature of using a filter G is the same. Whilst in the first embodiment the signal components of the speech relating to the far end signal RFE are attenuated, in the second embodiment the background noise relating to the received far end signal in TNE is emphasized with essentially the same effect.

In FIG. 5B the second embodiment is depicted as Echo Canceling Device ECD. Note that the blocks are similar to that of the first embodiment, but, the function is not the same. Here the VAD outputs the No-Talk signal NT, the Near-End-Single-Talk signal NEST and the Double-Talk signal DT. The signal NT controls when one of the two signals TNE and TNE' is used by the BEST unit via the switch SW. In principle the aim is to estimate the background signal. Thus, this can only be done when no near end and no far end talk signal is present in TNE and TNE'. Consequently, the VAD unit indicates no near end and far end signal by means of the signal NT (No Talk). The VAD decision signals NEST DT and NT are based on observing two signals related to the near end and the far end, in this case TNE' and RFE' respectively.

As explained above, the unit Background ESTimator means BEST estimates the spectral characteristics of the TNE or TNE' during NT. The estimation may be, as in the first embodiment, parametric or non-parametric. The estimated spectral characteristic of the background is fed to the ADJ unit.

In the second embodiment the main purpose of ADJ is to set the amplification filter G, so as to amplify spectral content of TNE' related to the background spectrum. The adjustment ADJ unit ADJ may also reshape the output of the device BEST so that unity can be used during Near-End-Single-Talk, i.e. when no far end signal is present in the transmission signal TNE. The reshaping of the output of the device BEST may also be, as in the first embodiment, related to the termination and start of speech signals. That is, the adjustment unit ADJ may gradually flatten the spectral shape of the best estimate when NEST is indicated by the VAD block. On the other hand, when the signal NEST is indicating no near end speech the and the signal DT is not indicating Double-Talk, the flat spectral characteristic of G can gradually be increased to significantly amplify the background signal in TNE'. The DT flag alone can be used as to set the filter G to unity.

This is possible because the near end signal will mask the residual echo in TNE'. Obviously, the ADJ unit can be considered as means for setting the filter G given additional information related to the speech activity on the far end and near end signals.

In the first embodiment of the present innovation a filter G is designed so as to attenuate spectral characteristics related to the far end signal. For simplicity it can be assumed that a filter determined according to the first embodiment is a all zero filer (FIR) represented by $$G_1(q) = \sum_{k=0}^{K} b_k q^{-k} \tag{10}$$

In the second embodiment the computed and adjusted filter G is used so as to emphasize i.e. amplify the background signal relating to the near end side. This filter may be estimated as an all pole filter represented by $$G_2(q) = \frac{\gamma}{1 + \sum_{k=1}^{K} a_k q^{-k}} \tag{11}$$

Obviously, it is possible to combine the first and second embodiment so as to obtain a filter which attenuates the far end signal and emphasize the background signal. The obtained filter may be used as G and it will typically be an Infinite Impulse Response (IIR) filter $$G(q) = G_1(q)G_2(q) = \frac{\gamma \sum_{k=0}^{K} b_k q^{-k}}{1 + \sum_{k=1}^{K} a_k q^{-k}}. \quad (12)$$

Therefore, the first and second embodiment can be combined, i.e. the removing of the spectral content relating to the far end signal can be carried out simultaneously with the emphasizing i.e. amplifying of the spectral content of the transmission signal. That is, the spectral content relating to the far end signal is removed and the background spectral content relating to the near end signal (determined in speech pauses) is emphasized (the model is determined in the speech pauses and the amplification can take place in the speech pauses and/or during a speech activity).

THIRD EMBODIMENT OF THE INVENTION

Also a noise generation means NGM' similar to the one shown in FIG. 2B can be used in connection with the invention according to a third embodiment. In the third embodiment an additional noise generation means NGM can be provided essentially at the output of the echo cancellation device EC where an additional adder ADD2 is placed, cf. FIG. 5 and FIG. 5C.

Figure 5C:
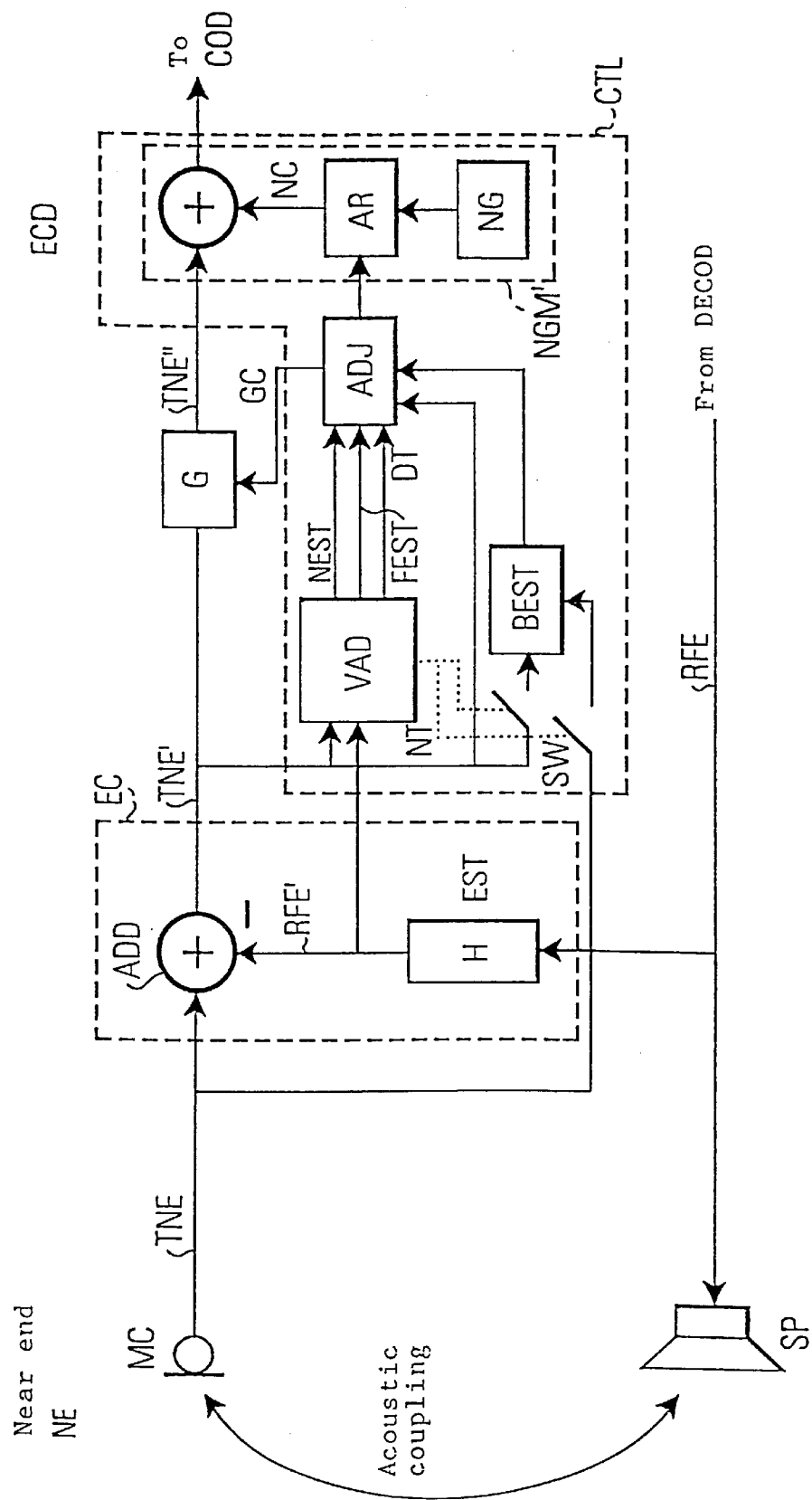
FIG. 5C shows a block diagram of an echo cancellation device EC according to the third embodiment of the present invention.

That is, in the third embodiment illustrated in the block diagram of FIG. 5C, the adder ADD2 is used. However, by contrast to FIGS. 2B or 2C it should be noted that the injected noise process is not directly associated with the background noise process nor is the noise switched. The injected noise process is based on the background spectrum but- also weighted using TNE'. The weighting is used to mask the residual echo by a noise process. The masking threshold may be computed in a similar way to that of J. D. Jonston, "Transform coding of audio signals using perceptual noise criteria", IEEE Journal on selected areas in communications, pp. 314–323, vol 6, February, 1988. In principle the, weighting function is computed as follows.

1. Compute the spectral content of TNE', using a bark scale based on M samples, where M is at least 320;
2. Convolve the spreading function with the bark spectrum of TNE';
3. Renormalize, the result w.r.t. the spread function.
4. Compare the estimated background spectrum (using a bark scale), BEST in FIG. 5C, to the result of step 3.
5. Increase the amplitudes of the background spectrum in cases were step 3 is greater in the sense of step 4.

Basically, the above procedure aims to increase the spectral energy of the background spectral estimate in regions were a residual echo contributes with power. The result of step 3, can be regarded as a masking threshold indicating that additional noise levels above the threshold will be perceived.

In fact the threshold may not necessarily have to be adaptable, e.g. recomputed every frame. The knowledge of the average residual echo spectral content may serve well in the computation.

Thus, the overall process obtained is close to the background signal but still with information regarding the far end signal RFE.

Furthermore, it should be clear that the added noise signal is an estimated version of the background signal having a superimposed additional noise process related to the spectral shape (long or short term) of the residual echo.

The principle advantage of adding a noise process to the subtractor output signal TNE' can be understood by first considering the prior art depicted in FIG. 2B and FIG. 2C. As can be seen, both figures contain a switch SW1 controlled by some logic (the detector VAD). Obviously, the performance depends to a large extent on how well the control logic operates. That is to say, if the system used in FIG. 2B and FIG. 2C indicates no near end signal TNE, whereas, in fact a near end signal TNE is present, the speech message in the conveyed transmission signal TNE is replaced by noise. Clearly, this behavior is not desired.

The present third embodiment will in case of a near end signal which is suddenly present in TNE' be passed on to the far end side. This is mainly due to the fact that the power of the adder ADD2 will on average be equal to the power of TNE'. Since the computations made are based on a relative long term basis (for example using as said averaged spectral information of the residual echo signal), it is clear that the masking threshold is unlikely to hide the near end signal, due to difference in spectral shape and power.

Finally, it is clear that the signal REF' or REF may be used in order to compute the desired masking threshold. The main advantage to use REF' or REF is that the near end signal never occur in those signals. Thus, the spectral content of REF' or REF has only to be filtered in a filter which mimics the effects of the echo canceller EC so as to obtain a signal which is spectrally close to the residual signal. Using this approach the injected noise signal may be recomputed. Also in the third embodiment a near end speech activity detector VAD is needed, as indicated in the schematic block diagram in FIG. 5C, for detecting single talk/double talk situations.

In FIG. 5 the overall principle of the three embodiments of the present invention is depicted. In this figure a block called control unit CTL is shown. In terms of the third embodiment the control box CTL, shown in FIG. 6 (which shows the control box in combination for FIG. 5 to FIG. 5C, operates according to the above described. That is, the threshold computation is based on REF' (REF not indicated) and TNE'. This information is feed back to the model used to generate an appropriate noise sequence in terms of an overall gain k and spectral shape adjustment. The raw background signal is determined via spectral estimation using conventional methods such as parametric or non-parametric methods. Note that in FIG. 6 this is made in a block denoted by "Dackground model est". Moreover, the local VAD signal indicates via Far End Single Talk (FEST) and Near End Single Talk (NEST) when to use the signal TNE' (or the transmission signal TNE) for the spectral content estimation.

Further Embodiments of the Invention

As explained above, the first to third embodiments can respectively operate separately, i.e. according to the first embodiment the spectral content of the receiving signal is removed, according to the second embodiment the background noise is emphasized i.e. amplified and according to the third embodiment a noise process is injected.

However, the first and second embodiment can be combined, i.e. the removing of the spectral content can be combined with the emphasizing of the background noise by the second embodiment. That is, the spectral content relating to the far end signal is removed and the background spectral content relating to the near end signal (determined in speech pauses) is emphasized (in the speech pauses and/or during speech activity).

The third embodiment can be used together with the first and second embodiment. For example, as shown in FIG. 5, prior to the speech coder input an additional adder ADD2 can be placed. One of the two inputs to the adder ADD2 is the attenuated version of TNE' (i.e. attenuated according to the first and/or second embodiment). The second input is an artificial background signal NC. Now the TNE' is attenuated with respect to the energy in the background signal, that is $$E_b = \frac{1}{N}\sum_{n=1}^{N} x^2(n),$$

where $E_b$ is evaluated when no near end and no far end signal is present and x(n) is TNE. Then the following operation is carried out:

$$Y = A + \frac{x(n)}{\sqrt{E_b}} G \qquad (11)$$

where A is a synthetic background signal from AR+NG and the filter G is as in embodiment one or two. Note, that the term $x(n)G/\sqrt{E_b}$ is scaled whereas A is not. Consequently, the speech coder will get a signal which is dominated by the background noise but still not only related to the background.

The third embodiment can be combined with the second and/or third embodiment. The first embodiment computes a filter, which is spectrally close to the inverse of the residual echo signal. Obviously, most of the residual echo has been eliminated. However, due to various limitations, such as non-linearity of the loud speaker, it may be desired to use the third embodiment as a mean to finish off the residual echo. This can be accomplished by feeding back the output of G to the threshold computation adjustment unit ADJ shown in FIG. 6.

When combined with the second embodiment, the third embodiment can base the computation of the threshold on the basis of the output of the filter G as adjusted according to the second embodiment.

Of course, in combination with the embodiments of the invention, it is possible to include the echo cancellation methods explained with reference to the means NGM and the means MSIDM shown in FIGS. 2A, 2B and 2C to further improve the echo cancellation.

Figure 6:
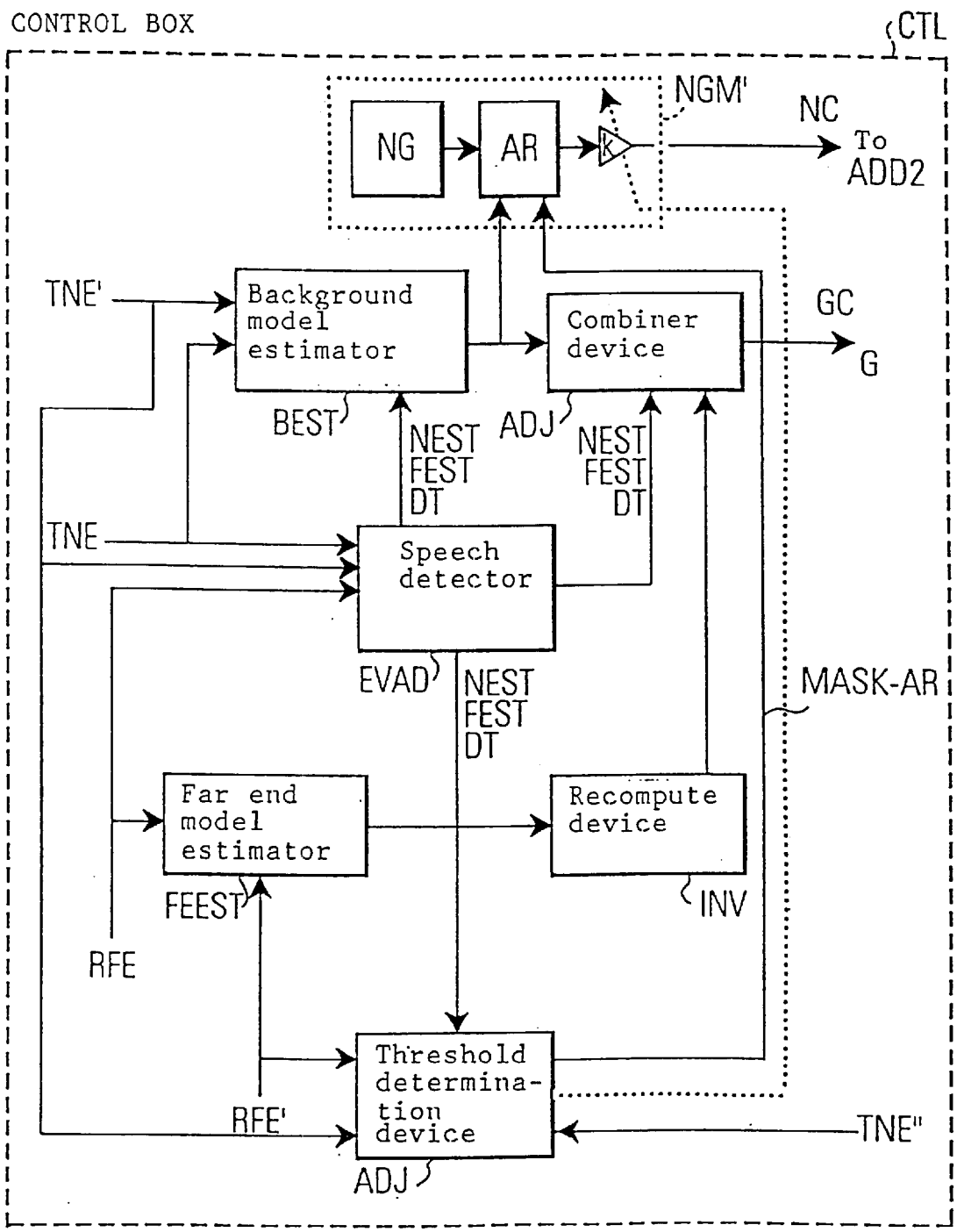
FIG. 6 shows the control box CTL used in FIGS. 5, 5-A, 5-B, 5-C.

As aforementioned, FIG. 6 shows the interaction of the three embodiments. In FIG. 6, a general control device CTL is shown. The units residing inside the control device CTL are thus the collection of the units shown in FIGS. 5A, 5B, 5C for the first, second and third embodiment. As can be seen in FIG. 6, the adjustment device ADJ comprises two blocks, namely a threshold computation device as described in the third embodiment and a combiner device. The combiner device combines numerator and denominator of the models of the first and second embodiment as indicated by Eq (12). Moreover, the combiner can be used to adjust the radius of zeros and poles of the filter function g depending on the status of the VAD output control signals NEST, FEST and DT (NT can be derived from these two signals). In the block NGM' an additional gain constant k can be added. The gain constant is used to adjust the output power of the block NGM' if this is necessary. The signal MASK-AR is the masking spectrum which is generated in the third embodiment and which is sent to the block NGMI and the AR unit.

INDUSTRIAL APPLICABILITY OF THE INVENTION

As explained above, the present invention can be used in any transceiver unit TRU of a telecommunication system TELE independently as to whether the communication process is a wireless communication or a wire communication. Furthermore, in principle the invention is also not based on a frame-wise processing for the signals. Although the acoustic coupling is the main coupling effect considered in the present invention, also other residual echoes caused by a capacitive and/or inductive coupling between the receiving and the transmitting part can be eliminated. Whilst the invention has been explained with reference to signals occurring in a telecommunication transceiver it is clear that signals of any other system can be used in which the problem of closed loops due to a coupling (thus producing echoes) exists.

Furthermore, it should be noted that the invention is not restricted to the described embodiments and examples and that the scope of the invention is only limited by the attached claims. As explained above, the present invention can comprise embodiments which result from separately described features in the claims and in the description. Therefore, the above described embodiments are only to be regarded as what the inventors presently conceive as the best mode of the invention.

Reference numerals in the claims only serve clarification purposes and do not limit the scope of the invention.

| LIST OF REFERENCE NUMERALS | |
|---|---|
| ADD | ADDer |
| ADJ | ADJusting |
| ANT | ANTenna |
| AR | AutoRegressive |
| AR-PAR | AutoRegressive - PARameter |
| BEST | Background ESTimator |
| CNT | CoNTroller |
| COD | CODer |
| DECOD | DECODer |
| DT | Double Talk |
| DTX | Discontinuous Transmission |
| EC | Echo Canceller |
| EST | ESTimator |
| FE | Far End |
| FEEST | Far End ESTimator |
| FEST | Far End Single Talk |
| FR | Full Rate |
| GC | filter G Control |
| GSM | Global System for Mobile communication |
| INV | INVerse |
| LAR | Log Area Ratio |
| MC | MiCrophone |
| MSID | Make SID |
| NC | Noise Control |
| NE | Near End |
| NEST | Near End Single Talk |
| NG | Noise Generator |
| NGM | Noise Generator Means |
| NT | No Talk |
| PNG | Pseudo Noise Generator |
| RC | Radio Circuits |
| RF | Radio Frequency |
| RFE | Received Far End |
| RFE' | Received Far End at output of H |
| RFESC | Received Far End Speech Coded |
| RPE-LTP | Regular Pulse Excitation-Long Term Prediction |
| SID | SIlence Descriptor |
| SNG | Synthetic Noise Generator |
| SP | loud SPeaker |
| SPECOD | SPEech CODer unit |
| SW | SWitch |
| TELE | TELEphone |
| TNE | Transmitted Near End |
| TNE' | Transmitted Near End after EC |
| TRU | TRansceiver Unit |
| TR | TRansmitt unit |
| TX | Transmitter |
| VAD | Voice Activity Detector |

What is claimed is:

1. An echo cancellation device (ECD) for canceling echoes caused by a coupling of a reception signal (RFE) received by a receiving unit (RX) of a transceiver unit (TRU) of a telecommunication system (TELE) to a transmitting unit (TR) thereof, comprising:

a) a transfer function estimator (EST, H) adapted to estimate the coupling transfer function (H) from the receiving unit (RC, SP, RCRT) to the transmitting unit (TR, MC, TCRT) and for processing the reception signal (RFE) with the estimated coupling transfer function (H);

b) a subtractor (ADD) adapted to subtract from the transmission signal (TNE) which includes an echo signal due to the coupling of the received signal (RFE) to the transmitting unit (MC, TCRT) the processed reception signal (RFE'); and c) a residual echo suppression device for suppressing residual echoes in the subtractor output signal (ADD); wherein d) the residual echo suppression device comprises a residual echo filter (G) having an adjustable filter function (g) adapted to remove from the subtractor output signal (TNE') of the subtractor (ADD) the spectral characteristics relating to the reception signal (RFE).

2. A device (ECD) according to claim 1, further comprising:

a spectral content determining means (CTL) adapted to receive one or more signals selected from the group consisting of the reception signal (RFE), the transmission signal (TNE) including the echo signal due to the coupling of the received signal (RFE) to the transmitting unit (MC, TCRT) the processed reception signal (RFE'), and the subtractor output signal (TNE'), to determine the spectral content relating to the reception signal (RFE) on the basis of one or more of these signals, and to set the filter function (g) of the residual echo filter (G) in accordance with the determined spectral content.

3. A device (ECD) according to claim 2, wherein the spectral content determining means (CTL) comprises a voice activity detector (VAD) for determining a voice activity in one or more signals selected from the group consisting of the transmission signal (TNE) including the echo signal, the processed reception signal (RFE') and the subtractor output signal (TNE'), the spectral content determining means (CTL) determining a spectral content relating to the reception signal in one or more signals selected from the group consisting of the transmission signal (TNE) including the echo signal in the subtractor output signal (TNE') only then when the voice activity detector (VAD) does not detect any voice activity in the signals.

4. A device (ECD) according to claim 2, wherein the residual echo filter (G) is a digital filter whose filter characteristic is determined by a set of adjustable filter parameters.

5. A device (ECD) according to claim 4, wherein the spectral content determining means (CTL) determines a spectral representation of the respective signal by estimating the model parameters of a linear model $(A(z^{-1}))$ of one or more of the signals (RFE; TNE; RFE; RFE'; TNE'), determines the parameters of an inverse of the linear model $(A^{-1})$ and sets the adjustable filter parameters to the inverse model $(A^{-1})$ to remove the spectral content relating to the reception signal (RFE).

6. A device (ECD) according to claim 5, wherein the linear model is an AutoRegressive (AR) model or an AutoRegressive eXogenous (ARX) model from residual echo to far end signal.

7. A device (ECD) according to claim 5, wherein the determining means (CTL) determines a Discrete Fourier Transform (DFT) of the subtractor output signal (TNE') including the residual echo signal or the transmission signal (TNE) including the echo signal and a Discrete Fourier Transform (DFT) of the reception signal (RFE) and adjusts the filter parameters on the basis of a subtraction of a scaled version ($\alpha$) of the Discrete Fourier Transform (DFT) of the reception signal (RFE) from the Discrete Fourier Transform (DFT) of the transmission signal (TNE) including the echo signal or from the Discrete Fourier Transform (DFT) of the subtractor output signal (TNE') including the residual echo signal.

8. A device (ECD) according to claim 7, wherein the filter operation achieved by the setting of the filter parameters of the digital filter is determined to be:

$$G(\omega_i)=(1-\alpha * X(\omega_i)/M(\omega_i))$$

where $G(\omega_i)$ is the Discrete Fourier Transform of the filter function g, $X(\omega_i)$ is the Discrete Fourier Transform of the reception signal, $M(\omega_i)$ is the Discrete Fourier Transform of the transmission signal (TNE) including the echo signal or from the Discrete Fourier Transform (DFT) of the subtractor output signal (TNE') including the residual echo signal, and a is the scaling factor.

9. A device (ECD) according to claim 1, further comprising:

a single/double talk detector (VAD, DT) adapted to detect a speech transmission in one or more signals selected from the group consisting of the reception signal (RFE), the transmission signal (TNE) including the echo signal due to the coupling of the received signal (RFE) to the transmitting unit (MC, TCRT), the processed reception signal (RFE') and the subtractor output signal (TNE') for determining a speech activity in one or more signals selected from the group consisting of the reception and transmission signal.

10. A device (ECD) according to claim 9, wherein when the single/double talk detector (VAD, DT) determines a speech activity in the reception signal and no speech activity in the transmission signal, the adjustable filter function (g) is adjusted by a control circuit (CTL) to an all-pass circuit;

when the single/double talk detector (VAD, DT) determines no speech activity in the reception signal and the start of a speech activity in the transmission signal, when the adjustable filter function (g) is controlled to an all-pass circuit, the adjustable filter function (g) is kept in the all-pass state;

when the single/double talk detector (VAD, DT) determines a speech activity in the transmission signal and the start of a speech activity in the reception signal, when the adjustable filter function (g) is controlled to an all-pass circuit, the adjustable filter function (g) is controlled such that the spectral content is reduced to some extent; and when the single/double talk detector (VAD, DT) determines the stop of a speech activity in the transmission signal and the start of a speech activity in the reception signal, the adjustable filter function (g) is controlled such that the spectral content is removed.

11. A device (ECD) according to claim 1, wherein
the adjustable filter function (g) is further adapted to amplify in the subtractor output signal (TNE') of the subtractor (ADD) the spectral content of the background signal in the transmission signal (TNE, TNE') transmitted by the transmitting unit (TR, TCRT).

12. A device (ECD) according to claim 11, wherein
the background spectral content is determined in speech pauses of the transmission signal (TNE, TNE') and the amplification is performed in one or more conditions selected from the group of conditions consisting of speech pauses and during a speech in the transmission signal (TNE, TNE') whilst the spectral content removing relating to the reception signal (RFE) is performed at all times.

13. A device (ECD) according to claim 1 further comprising:
a noise generation means (NGM'; AR, ADD2) adapted to add noise in the filter output signal (TNE') in a spectral region relating to the reception signal (RFE) for masking residual echoes.

14. A transceiver unit (TRU) including an echo cancellation device (EC) according to claim 1, wherein
the reception unit (RX; SP) comprises a loudspeaker (SP) outputting the reception signal (RFE) and the transmission unit (TR, MC) comprises a microphone (MC) which generates the transmission signal (TNE), wherein the echoes are caused by an acoustic coupling between the loudspeaker (SP) and the microphone (MC).

15. A transceiver unit (TRU) including an echo cancellation device (ECD) according to claim 1 and a speech coder (COD) downstream from the echo cancellation device (ECD).

16. An echo cancellation device (ECD) for canceling echoes caused by a coupling of a reception signal (RFE) received by a receiving unit (RX) of a transceiver unit (TRU) of a telecommunication system (TELE) to a transmitting unit (TR) thereof, comprising:
a) a transfer function estimator (EST, H) adapted to estimate the coupling transfer function (H) from the receiving unit (RX, SP, RCRT) to the transmitting unit (TR, MC, TCRT) and for processing the reception signal (RFE) with the estimated coupling transfer function (H);
b) a subtractor (ADD) adapted to subtract from the transmission signal (TNE) which includes an echo signal due to the coupling of the received signal (RFE) to the transmitting unit (MC, TCRT) the processed reception signal (RFE'); and
c) a residual echo suppression device for suppressing residual echoes in the subtractor output signal (ADD); wherein
d) the residual echo suppression device (G) comprises a residual echo filter (G) having an adjustable filter function (g) adapted to amplify in the subtractor output signal (TNE') of the substractor (ADD) the spectral content of the background signal in the transmission signal (TNE, TNE') transmitted by the transmitting unit (TR, TCRT).

17. A device (ECD) according to claim 16, further comprising:
a background signal model determining means (CTL) adapted to receive one or more signals selected from the group consisting of the transmission signal (TNE) including the echo signal due to the coupling of the received signal (RFE) to the transmitting unit (MC, TCRT) and the subtractor output signal (TNE'), to determine a background signal model on the basis of one or more of the signals selected from this group, and to set the filter function (g) of the residual echo filter (G) in accordance with the determined background signal model in order to emphasize the background signal spectral content.

18. A device (ECD) according to claim 17, wherein
the background signal model determining means (CTL) comprises a voice activity detector (VAD) for determining a voice activity in one or more signals selected from the group consisting of the transmission signal (TNE) including the echo signal and in the subtractor output signal (TNE'), the background signal model determining means (CTL) determining a model of the background signal only then when the voice activity detector (VAD) does not detect any voice activity in the signals.

19. A device (ECD) according to claim 16, wherein
the adjustable filter function (g) is further adaptable to remove from the subtractor output signal (TNE') of the substractor (ADD) the spectral characteristics relating to the reception signal (RFE).

20. A device (ECD) according to claim 16, further comprising:
a noise generation means (NGM'; AR, ADD2) adapted to add noise in the filter output signal (TNE') in a spectral region relating to the reception signal (RFE) for masking residual echoes.

21. An echo cancellation device (ECD) for canceling echoes caused by a coupling of a reception signal (RFE) received by a receiving unit (RX) of a transceiver unit (TRU) of a telecommunication system (TELE) to a transmitting unit (TR) thereof, comprising:
a) a transfer function estimator (EST, H) adapted to estimate the coupling transfer function (H) from the receiving unit (RX, SP, RCRT) to the transmitting unit (TR, MC, TCRT) and for processing the reception signal (RFE) with the estimated coupling transfer function (H);
b) a subtractor (ADD) adapted to subtract from the transmission signal (TNE) which includes an echo signal due to the coupling of the received signal (RFE) to the transmitting unit (MC, TCRT) the processed reception signal (RFE'); and
c) a residual echo suppression device for suppressing residual echoes in the subtractor output signal (ADD); wherein
d) the residual echo suppression device (G) comprises a residual echo filter (G) having an adjustable filter function (g) and a noise generation means (NGM'; AR, ADD2) adapted to add noise in the filter output signal (TNE') in a spectral region relating to the reception signal (RFE) for masking residual echoes.

22. A device (ECD) according to claim 21, further comprising:
a spectral content determining means (CTL) adapted to receive one or more signals selected from the group consisting of the reception signal (RFE, the transmission signal (TNE) including the echo signal due to the coupling of the received signal (RFE) to the transmitting unit (MC, TCRT) and the processed reception signal (RFE') and/or the subtractor output signal (TNE'), to determine the spectral region relating to the reception signal (RFE) on the basis of one or more of these signals.

23. A device (ECD) according to claim 21, wherein the filter function (g) is adjusted by a control means (CTL) to be an all-pass filter.

24. A device (ECD) according to claim 21, wherein the noise generation means (NGM') comprises an AR model unit (AR) driven by a noise generator (NG), wherein an adjustment unit (ADJ) is provided for controlling the AR unit to set a spectral shape required for the masking of the residual echo.

25. A device (ECD) according to claim 21, wherein the adjustable filter function (g) is adaptable to remove from the subtractor output signal (TNE') of the subtractor (ADD) the spectral characteristics relating to the reception signal (RFE).

26. A device (ECD) according to claim 21, wherein the adjustable filter function (g) is further adaptable to amplify in the subtractor output signal (TNE') of the subtractor (ADD) the spectral content of the background signal in the transmission signal (TNE, TNE') transmitted by the transmitting unit (TR, TCRT).

* * * * *

UNITED STATES PATENT AND TRADEMARK OFFICE
CERTIFICATE OF CORRECTION

PATENT NO.    : 6,597,787 B1                                               Page 1 of 1
DATED         : July 22, 2003
INVENTOR(S)   : Ulf Lindgren et al.

It is certified that error appears in the above-identified patent and that said Letters Patent is hereby corrected as shown below:

<u>Title page,</u>
Item [30], Foreign Application Priority Data, application number should be
-- DE 199 35 808.7 --.

<u>Column 26,</u>
Line 28, delete "a" and insert therefore -- *a* --.

Signed and Sealed this

Twenty-fifth Day of November, 2003

JAMES E. ROGAN
*Director of the United States Patent and Trademark Office*